United States Patent
Hou et al.

(10) Patent No.: US 9,563,674 B2
(45) Date of Patent: Feb. 7, 2017

(54) DATA EXPLORATION USER INTERFACE

(75) Inventors: Zhitao Hou, Beijing (CN); Xiao Liang, Beijing (CN); Haidong Zhang, Beijing (CN); Dongmei Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 373 days.

(21) Appl. No.: 13/589,999

(22) Filed: Aug. 20, 2012

(65) Prior Publication Data

US 2014/0053091 A1    Feb. 20, 2014

(51) Int. Cl.
| | | |
|---|---|---|
| *G06F 3/048* | (2013.01) | |
| *G06F 17/30* | (2006.01) | |
| *G06F 3/0488* | (2013.01) | |
| *G06F 3/0486* | (2013.01) | |
| *G06F 3/0484* | (2013.01) | |

(52) U.S. Cl.
CPC ....... *G06F 17/30554* (2013.01); *G06F 3/0486* (2013.01); *G06F 3/0488* (2013.01); *G06F 3/04842* (2013.01); *G06F 3/04847* (2013.01); *G06F 3/04883* (2013.01); *G06F 3/04886* (2013.01); *G06F 17/30389* (2013.01); *G06F 17/30539* (2013.01); *G06F 17/30572* (2013.01); *G06F 17/30592* (2013.01)

(58) Field of Classification Search
CPC .............................................. G06F 17/30554
See application file for complete search history.

(56) References Cited

U.S. PATENT DOCUMENTS

| | | | | |
|---|---|---|---|---|
| 5,535,324 | A * | 7/1996 | Alvarez et al. | 715/209 |
| 6,768,997 | B2 * | 7/2004 | Schirmer | G06F 3/0481 |
| | | | | 707/779 |
| 7,149,983 | B1 | 12/2006 | Robertson et al. | |
| 7,461,052 | B2 * | 12/2008 | Dettinger et al. | |
| 7,738,032 | B2 * | 6/2010 | Kollias | G03B 29/00 |
| | | | | 348/333.11 |

(Continued)

FOREIGN PATENT DOCUMENTS

EP    0172368 A2    2/1986

OTHER PUBLICATIONS

International Search Report & Written Opinion for PCT Patent Application No. PCT/US2013/055225, Mailed Date: Oct. 22, 2013, Filed Date: Aug. 16, 2013, 11 Pages.

(Continued)

*Primary Examiner* — William Bashore
*Assistant Examiner* — Nathan Shrewsbury
(74) *Attorney, Agent, or Firm* — Sandy Swain; Micky Minhas; Lee & Hayes, pllc.

(57) ABSTRACT

A data exploration user interface includes a selection area with selectable representations of queryable fields of a data source and a visualization area where query results are displayed as data visualizations. Queries are generated by dragging fields from the selectable area to the visualization area of the user interface. A tree structure of data visualizations may be created by dragging data points out of a displayed visualization and applying additional fields to create a new query and resulting visualization. The tree structure is graphically represented with path indicators that provide historical context for each new data visualization within the visualization are of the user interface.

18 Claims, 31 Drawing Sheets

(56) References Cited

U.S. PATENT DOCUMENTS

| | | | |
|---|---|---|---|
| 7,783,678 B2* | 8/2010 | Kim | 707/805 |
| 8,326,852 B2* | 12/2012 | Dettinger et al. | 707/758 |
| 8,527,909 B1 | 9/2013 | Mullany | |
| 8,583,631 B1 | 11/2013 | Ganapathi et al. | |
| 2002/0070953 A1* | 6/2002 | Barg et al. | 345/700 |
| 2002/0073115 A1 | 6/2002 | Davis | |
| 2002/0163547 A1 | 11/2002 | Abramson et al. | |
| 2003/0071814 A1 | 4/2003 | Jou et al. | |
| 2004/0056899 A1 | 3/2004 | Sinclair, II et al. | |
| 2005/0165824 A1* | 7/2005 | Farnham et al. | 707/102 |
| 2005/0234960 A1* | 10/2005 | Chickering et al. | 707/102 |
| 2007/0005562 A1 | 1/2007 | Chau et al. | |
| 2008/0091668 A1* | 4/2008 | Dettinger et al. | 707/4 |
| 2008/0259041 A1 | 10/2008 | Blumenberg et al. | |
| 2009/0083340 A1* | 3/2009 | Baskaran et al. | 707/203 |
| 2009/0182748 A1* | 7/2009 | Walker | G06Q 10/00 |
| 2009/0327975 A1 | 12/2009 | Stedman | |
| 2010/0010980 A1* | 1/2010 | Dettinger et al. | 707/4 |
| 2010/0050076 A1 | 2/2010 | Roth | |
| 2010/0079498 A1 | 4/2010 | Zaman et al. | |
| 2010/0082232 A1* | 4/2010 | Lee | G01C 21/3667 701/533 |
| 2010/0156804 A1 | 6/2010 | Young | |
| 2010/0162146 A1 | 6/2010 | Winkler et al. | |
| 2010/0214299 A1 | 8/2010 | Robertson et al. | |
| 2010/0235771 A1* | 9/2010 | Gregg, III | 715/769 |
| 2010/0257447 A1 | 10/2010 | Kim et al. | |
| 2010/0265200 A1 | 10/2010 | Cho et al. | |
| 2010/0268463 A1* | 10/2010 | Kurtti | G01C 21/3679 701/469 |
| 2010/0325166 A1 | 12/2010 | Rubin et al. | |
| 2011/0012856 A1 | 1/2011 | Maxwell et al. | |
| 2011/0012931 A1 | 1/2011 | Abe | |
| 2011/0029853 A1* | 2/2011 | Garrity | G06F 11/32 715/215 |
| 2011/0115814 A1 | 5/2011 | Heimendinger et al. | |
| 2011/0164060 A1 | 7/2011 | Miyazawa et al. | |
| 2011/0178974 A1* | 7/2011 | Sayal et al. | 706/50 |
| 2011/0225525 A1* | 9/2011 | Chasman et al. | 715/763 |
| 2011/0283231 A1 | 11/2011 | Richstein et al. | |
| 2011/0289161 A1* | 11/2011 | Rankin et al. | 709/206 |
| 2012/0005228 A1* | 1/2012 | Singh | G06F 17/30398 707/769 |
| 2012/0030566 A1 | 2/2012 | Victor | |
| 2012/0054226 A1* | 3/2012 | Cao et al. | 707/769 |
| 2012/0166470 A1* | 6/2012 | Baumgaertel et al. | 707/769 |
| 2012/0229466 A1 | 9/2012 | Riche et al. | |
| 2013/0044114 A1* | 2/2013 | Burtner et al. | 345/442 |
| 2013/0151572 A1* | 6/2013 | Brocato et al. | 707/805 |
| 2013/0185624 A1* | 7/2013 | Appleyard et al. | 715/234 |
| 2014/0049557 A1 | 2/2014 | Hou et al. | |
| 2014/0164285 A1 | 6/2014 | Ashburn et al. | |

OTHER PUBLICATIONS

Keim, et al., "Using Visualization to Support Data Mining of Large Existing Databases", In Proceedings of the IEEE Visualization Workshop on Database Issues for Data Visualization, Oct. 26, 1993, 20 Pages.

"MagicalPad Take Control of Your Notes", Retrieved on: Mar. 27, 2012, Available at: http://www.magicalpad.com/wp-content/uploads/2011/10/MagicalPad-User-Manual.pdf 34 pages.

Song, et al., "WYSIWYF: Exploring and Annotating Volume Data with a Tangible Handheld Device", In Proceedings of the Annual Conference on Human Factors in Computing Systems, May 7, 2011, pp. 1333-1342.

"GeogXpert for Ipad," Published on: Aug. 29, 2011, Available at <<http://www.alancsmith.co.uk/geogxpertipad/GeogXpertIPad_1.html>> 3 pages.

Bailey, et al., "From Records to Data with Viewshare: An Argument, An Interface, A Design", In Proceedings of Bulletin of the American Society for Information Science & Technology, vol. 38 Issue 4, Apr. 2012, 4 pages.

Heer, Jeffrey Michael, Supporting Asynchronous Collaboration for Interactive Visualization, In Proceedings of the Dissertation, Dec. 17, 2008, 209 pages.

Interactive Analysis for Business Information and Insights, In Proceedings of the White Paper, Jul. 19, 2012, 4 pages.

Office action for U.S. Appl. No. 13/589,958, mailed on Jul. 31, 2014, Hou et al., "User Interface Tools for Exploring Data Visualizations", 24 pages.

Reports Tour—Charting, Retrieved on: Sep. 27, 2013, Available at: http://www.zoho.com/reports/Charting-Data.html.

Tour the Complete Business Data Environment, Published on: Oct. 3, 2012, Available at: http://chartio.com/product/tour.

Office action for U.S. Appl. No. 13/589,958, mailed on Mar. 17, 2015, Hou et al., "User Interface Tools for Exploring Data Visualizations," 26 pages.

The European Office Action mailed Oct. 29, 2015 for European Patent Application No. 13753943.3, a counterpart foreign application of U.S. Appl. No. 13/589,958, 13 pages.

Office action for U.S. Appl. No. 14/201,368, mailed on May 5, 2016, Hou et al. "Direct Manipulation Interface for Data Analysis", 20 pages.

The European Office Action mailed Jun. 28, 2016 for European Patent Application No. 13753943.3, a counterpart foreign application of U.S. Appl. No. 13/589,958, 8 pages.

\* cited by examiner

DATA EXPLORATION USER INTERFACE

BACKGROUND

Data visualizations enable users to view graphical representations of data relationships. Data visualization formats include by way of example, bar charts, tree charts, pie charts, line graphs, bubble graphs, geographic maps, and any other format in which data can be graphically represented. Large data sources may enable a user to explore the data in a variety of ways. For example, any number of data fields may be used to filter the data.

When exploring data in a data source, a user may desire to view the data in a variety of ways. This may include different visualization formats and/or different sets of query results. Furthermore, oftentimes, a first set of query results obtained from a data source may spark user interest for a second, possibly related query against the data source. As a result, a user may perform several successive queries and view the results in variety of formats before satisfactorily identifying the data in which they are most interested. In many existing user interfaces that support data queries, such successive query reformulating can be a tedious and time-consuming process.

SUMMARY

This document describes a data exploration user interface. In one aspect, an interactive user interface is provided through which queries against a data source may be intuitively generated and query results graphically displayed as data visualizations. Drill-down queries are supported through selection of particular data points in a displayed data visualization, and pivots are easily achieved by applying an additional queryable field to a portion of a previous query result. In a touch-screen environment, gestures are supported to enable changes from one data visualization format to another, and to enable intuitive user-submission of sort commands. Graphical path indicators provide a visual indicator of the relative source of each data visualization within the data exploration user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

A data exploration user interface enables a user to intuitively explore data through data visualizations. Queryable fields of a data source are visually represented in a selection area of the user interface and can be dragged and dropped into a visualization area of the user interface to query the data source and display the results as a data visualization. Data points within the displayed data visualizations may be selected and pulled out to generate child-level data visualizations, and visual paths are maintained to provide historical context as large visualization structures are built. Data may be sorted and data visualization formats may be easily modified through the use of gestures, for example in a touch-screen environment, and displayed data visualizations may be merged to enable easy comparison of different query results. The graphical nature of the user interface provides an intuitive data exploration experience.

Example Environment

Figure 1:
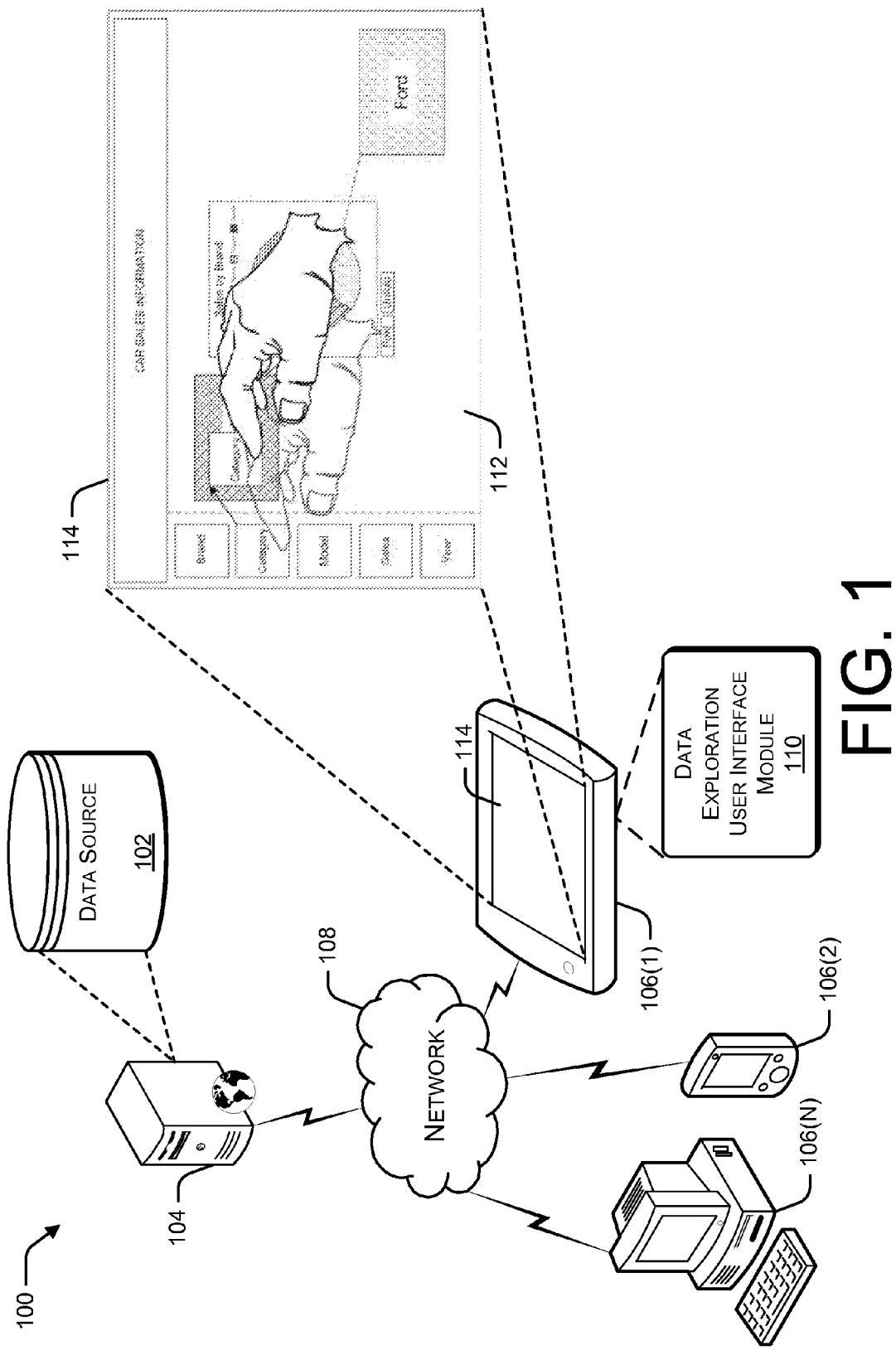
FIG. 1 is a pictorial diagram of an example environment in which a data exploration user interface may be implemented.

FIG. 1 illustrates an example environment 100 in which a data exploration user interface as described herein may be implemented. Example environment 100 includes a data source 102, which may be stored at a server system 104. A computing device 106 may access the data source 102 over a network 108. Network 108 is representative of, for example, the Internet. The computing device (e.g., computing device 106(1)) includes a data exploration user interface module 110, which presents data from data source 102 in a data exploration user interface 112 via a graphical display 114. In an alternate implementation, the data source 102 may be stored locally, for example, on computing device 106(1).

Various types of computing devices 106 may be configured to access the data source 102 over the network 108. For example, a tablet computer system 106(1), a mobile phone 106(2), and a desktop computer system 106(N) may each be configured to enable access to data source 102.

Data exploration user interface 112 presents interactive graphical objects that enable a user to intuitively explore data from data source 102. Example attributes of data exploration user interface 112 are described below with reference to FIGS. 2-25.

Example Data Exploration

FIGS. 2-25 illustrate example screen displays that may be generated through the data exploration user interface described herein. The series of screen displays illustrated in FIGS. 2-25 are merely one example based on an example data source. The described data exploration user interface may be applied to any type of data source that may support data visualizations, and the data visualizations that are rendered may take on any visualization format.

Figure 2:
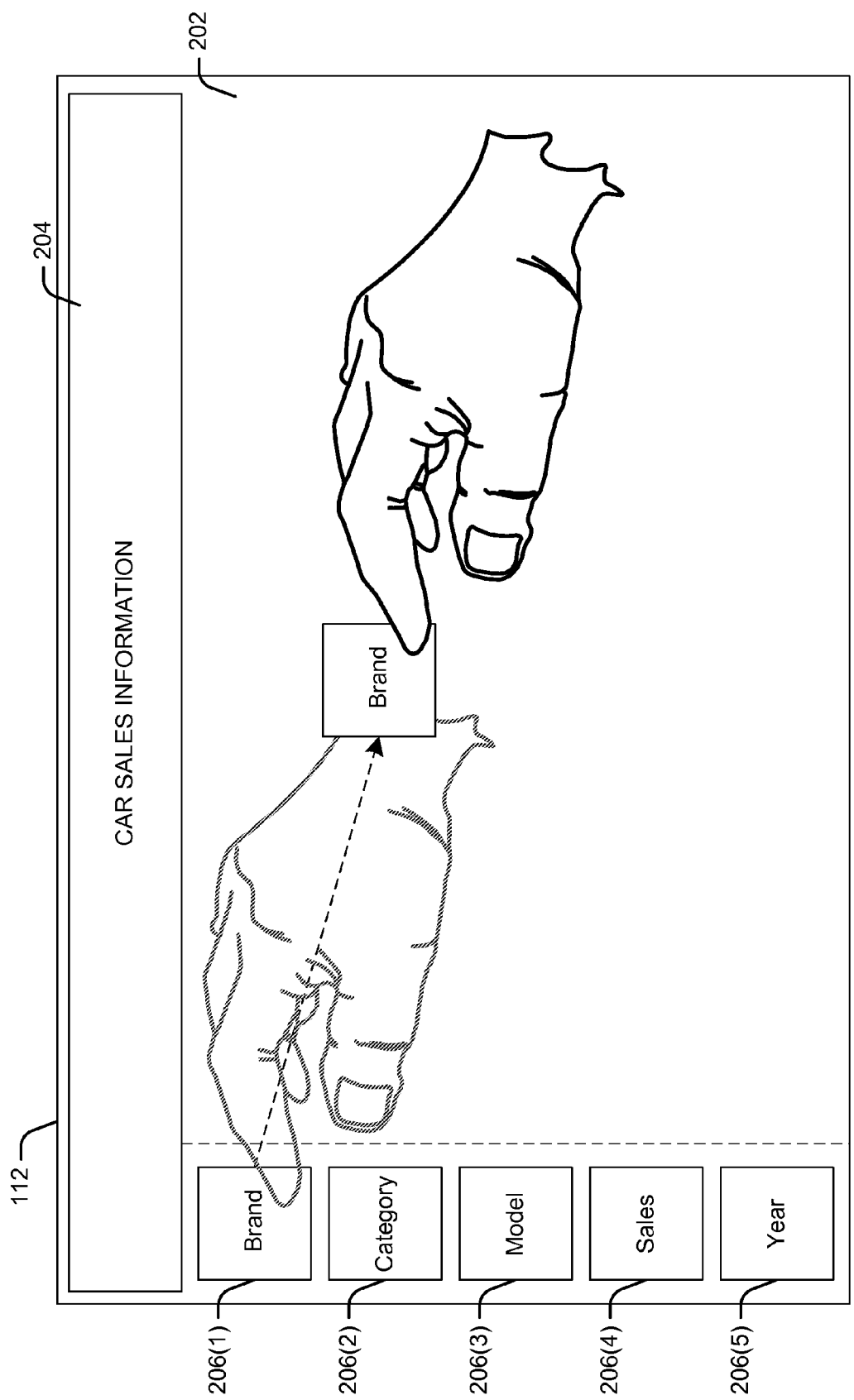
FIG. 2 is a pictorial diagram of an example screen display of a data source overview view within a data exploration user interface.

FIG. 2 illustrates a data source overview view 202 within data exploration user interface 112. In the illustrated example, data source 102 is a database of car sales information. In the data source overview view 202, a description 204 of the available data is displayed at the top of the display, and the fields from which users may select to view data from data source 102 are displayed as discrete blocks 206 in a left portion of the display.

A user may select any of the discrete blocks 206 from the left portion of the display to initiate a request for data associated with the selected block. For example, in the illustrated touch-screen environment (e.g., using tablet computer system 106(1)), a user may touch the "Brand" block 206(1) with their finger and drag the "Brand" block 206(1) from the left portion of the display (a selection area) into the right portion of the display (a visualization area). When the "Brand" block 206(1) is dropped in the right portion of the display, a query is executed against the data source 102 based on "brand."

Figure 3:
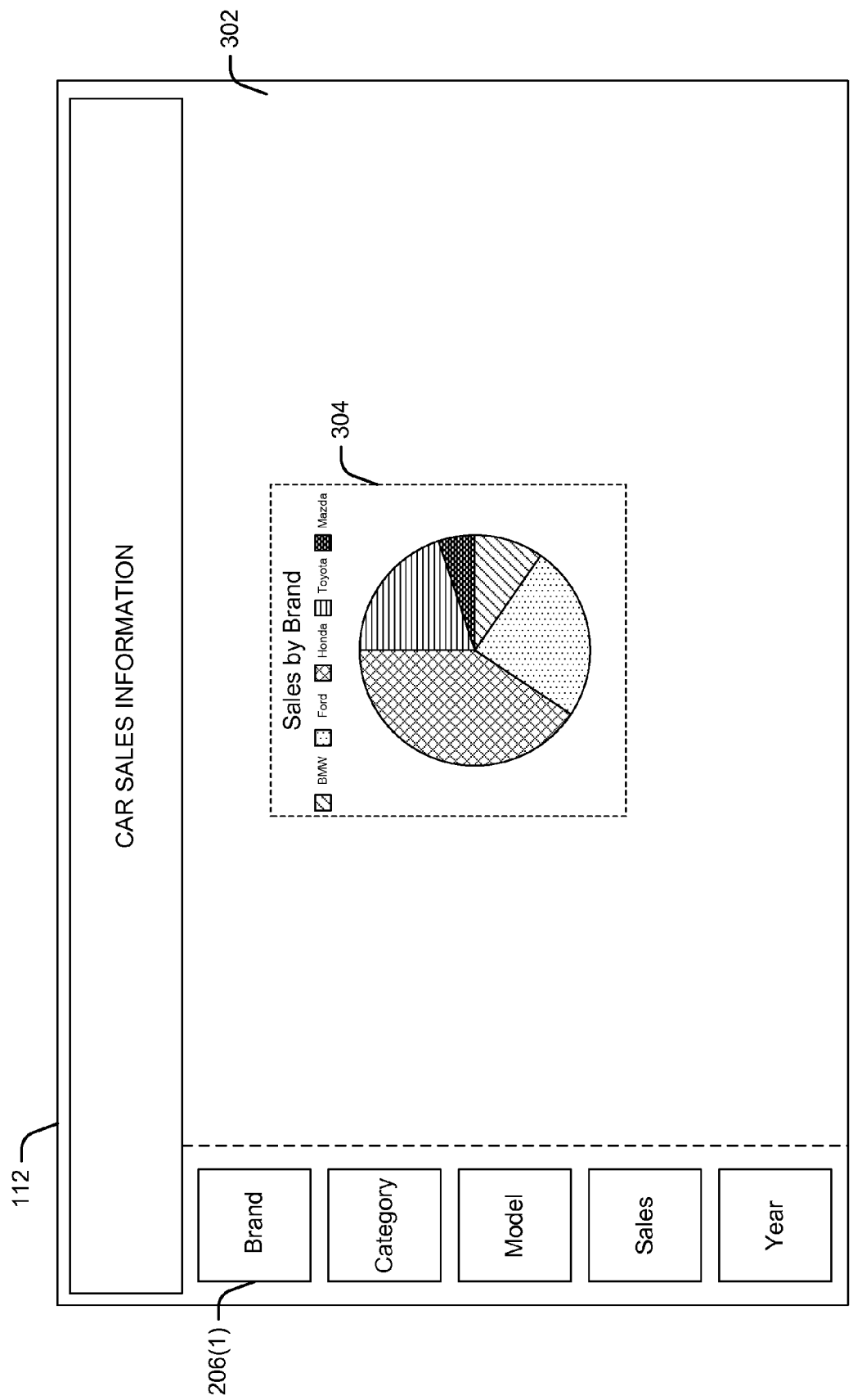
FIG. 3 is a pictorial diagram of an example screen display of a root query visualization view within a data exploration user interface.

FIG. 3 illustrates a root query visualization view 302 within data exploration user interface 112. In the illustrated example, in response to the user dragging the "Brand" block 206(1) from the left portion of the display to the right portion of the display, as described above with reference to FIG. 2, data exploration user interface module 110 renders a visualization of data from data source 102, based on "Brand." For example, as shown in FIG. 3, a pie chart 304 showing sales information by brand is rendered in the right portion of the display.

Figure 4:
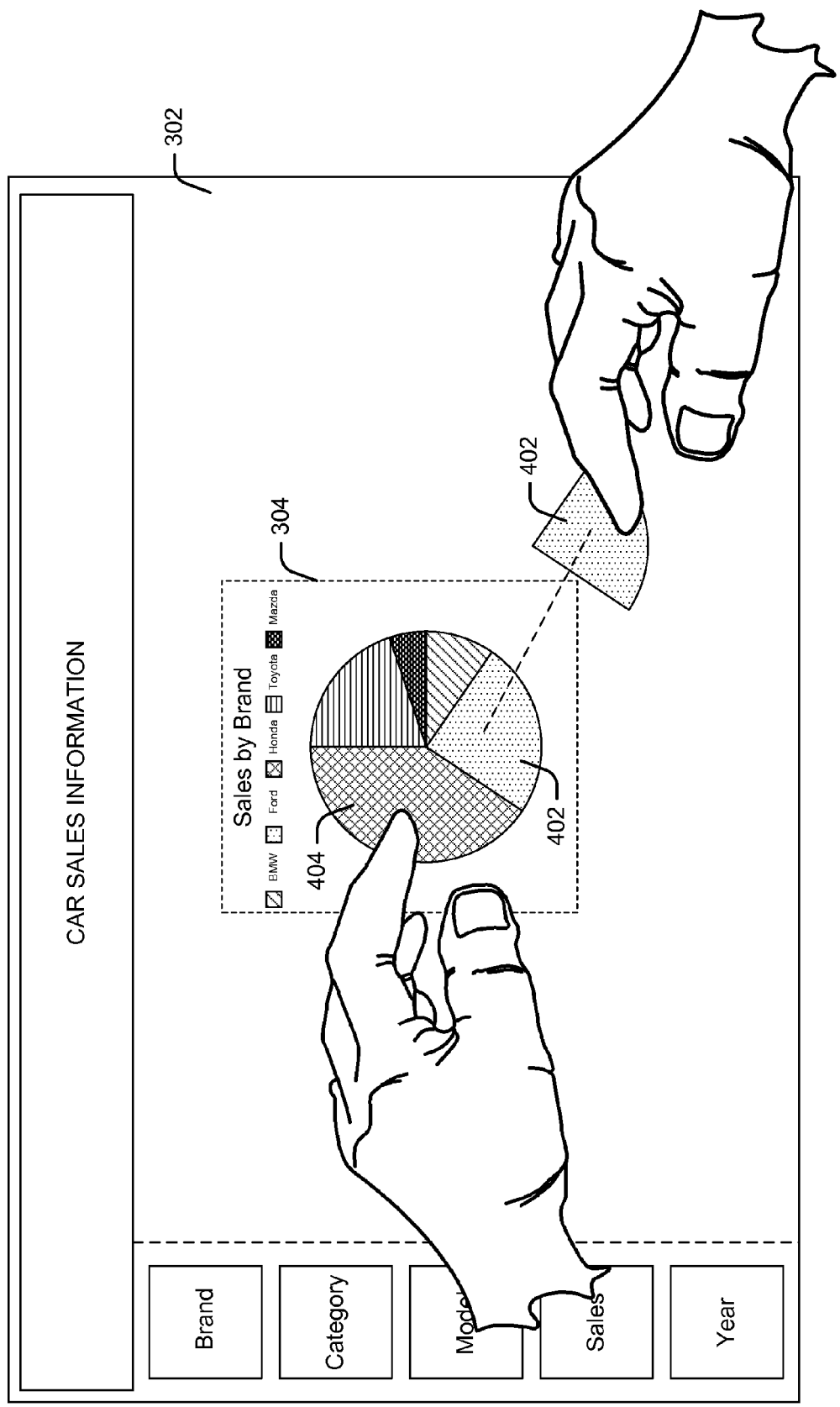
FIG. 4 is a pictorial diagram illustrating data selection within the root query visualization view of a data exploration user interface.

FIG. 4 illustrates data selection within the root query visualization view 302. In the illustrated example, if the user wishes to see additional details about the top two brands, by sales, the user can select and drag out the corresponding sections of the pie chart 304. For example, the user may select and drag out section 402, which represents sales of Ford brand vehicles. Similarly, the user may select and drag out section 404, which represents sales of Honda brand vehicles.

Figure 5:
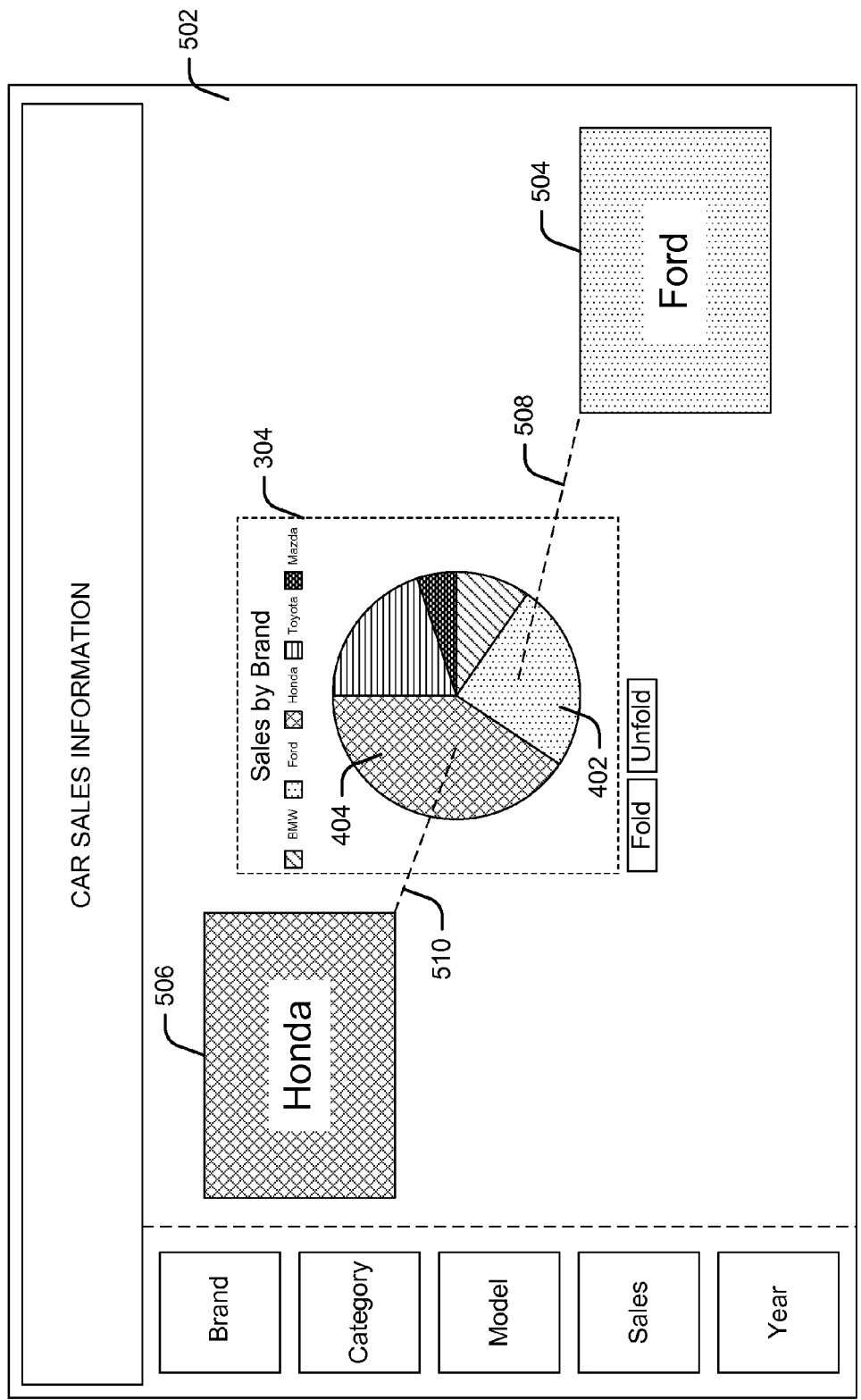
FIG. 5 is a pictorial diagram of an example screen display of a first level drill down view within a data exploration user interface.

FIG. 5 illustrates a first level drill down view 502 within data exploration user interface 112. The first level drill down view 502 includes blocks 504 and 506, which represent, respectively, the user-selected sections 402 and 404 from pie chart 304. Furthermore, first level drill down view 502 includes path indicators 508 and 510, which provide a visual indication of how blocks 504 and 506 were generated from sections 402 and 404, respectively, of pie chart 304. Specifically, each path indicator represents a connection between a parent data visualization object and a child data visualization object.

Figure 6:
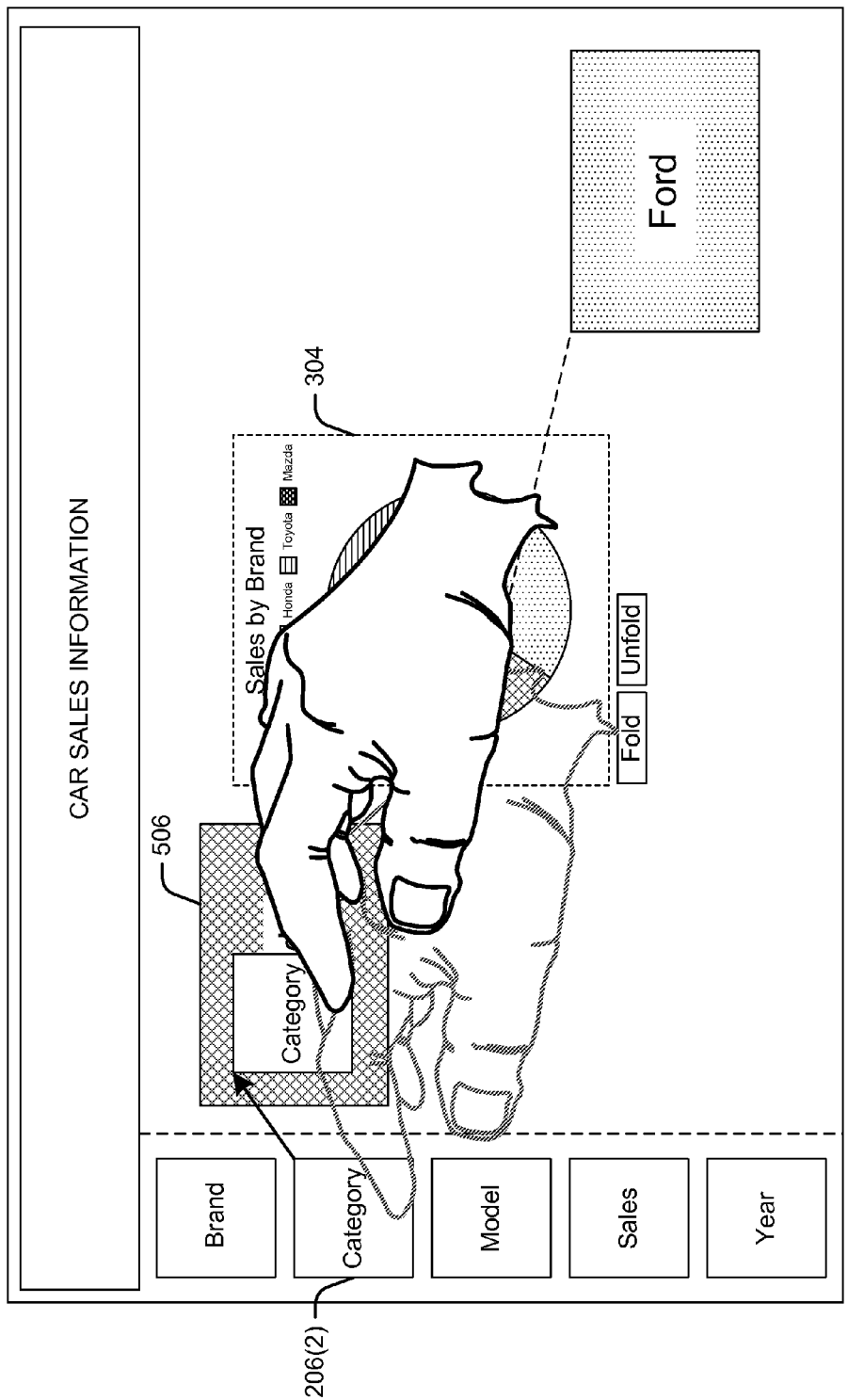
FIG. 6 is a pictorial diagram illustrating application of another data field within the first level drill down view of a data exploration user interface.

FIG. 6 illustrates application of another data field in the first level drill down view 502. After a section (e.g., section 404) has been selected from pie chart 304, resulting in a block outside of pie chart 304 (e.g., block 506), another field can be selected from the left portion of the display and applied to one of the blocks generated from the pie chart to pivot on the other field. For example, as illustrated in FIG. 6, the user may select block 206(2), which represents the "Category" field, and drop the "Category" field onto block 506, which represents Honda vehicles.

Figure 7:
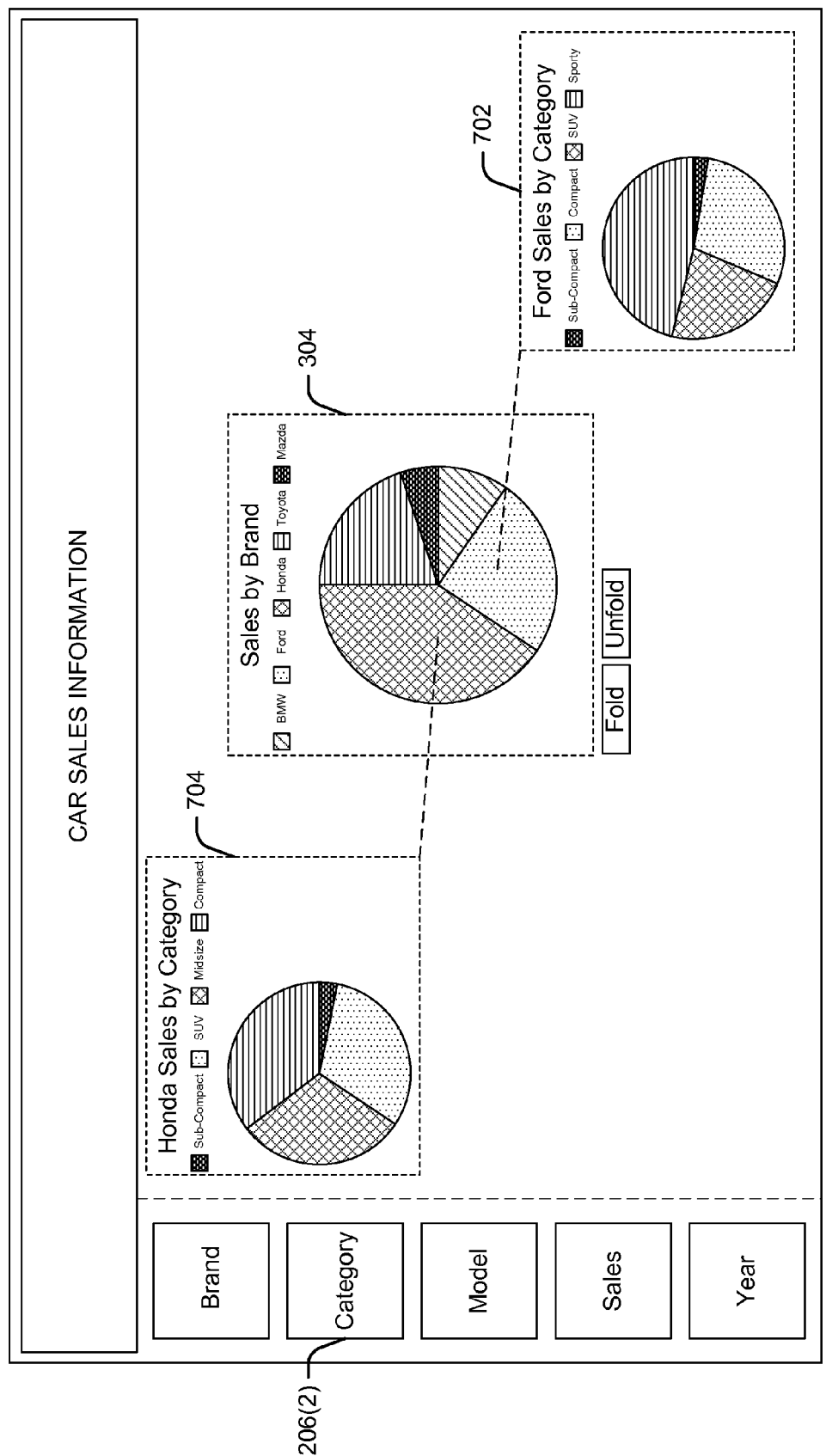
FIG. 7 is a pictorial diagram illustrating application of a second data field to a previous selection within a data exploration user interface.

FIG. 7 illustrates the application of a second field to a previous selection. As illustrated in FIG. 6, the user has selected the "Category" field and applied it to block 506.

FIG. 7 illustrates the result of the "Category" field being applied to blocks 504 and 506. Block 504, which represented sales of Ford vehicles is replaced by a pie chart 702 that represents Ford sales by category. Similarly, block 506, which represented sales of Honda vehicles is replaced by a pie chart 704 that represents Honda sales by category.

Figure 8:
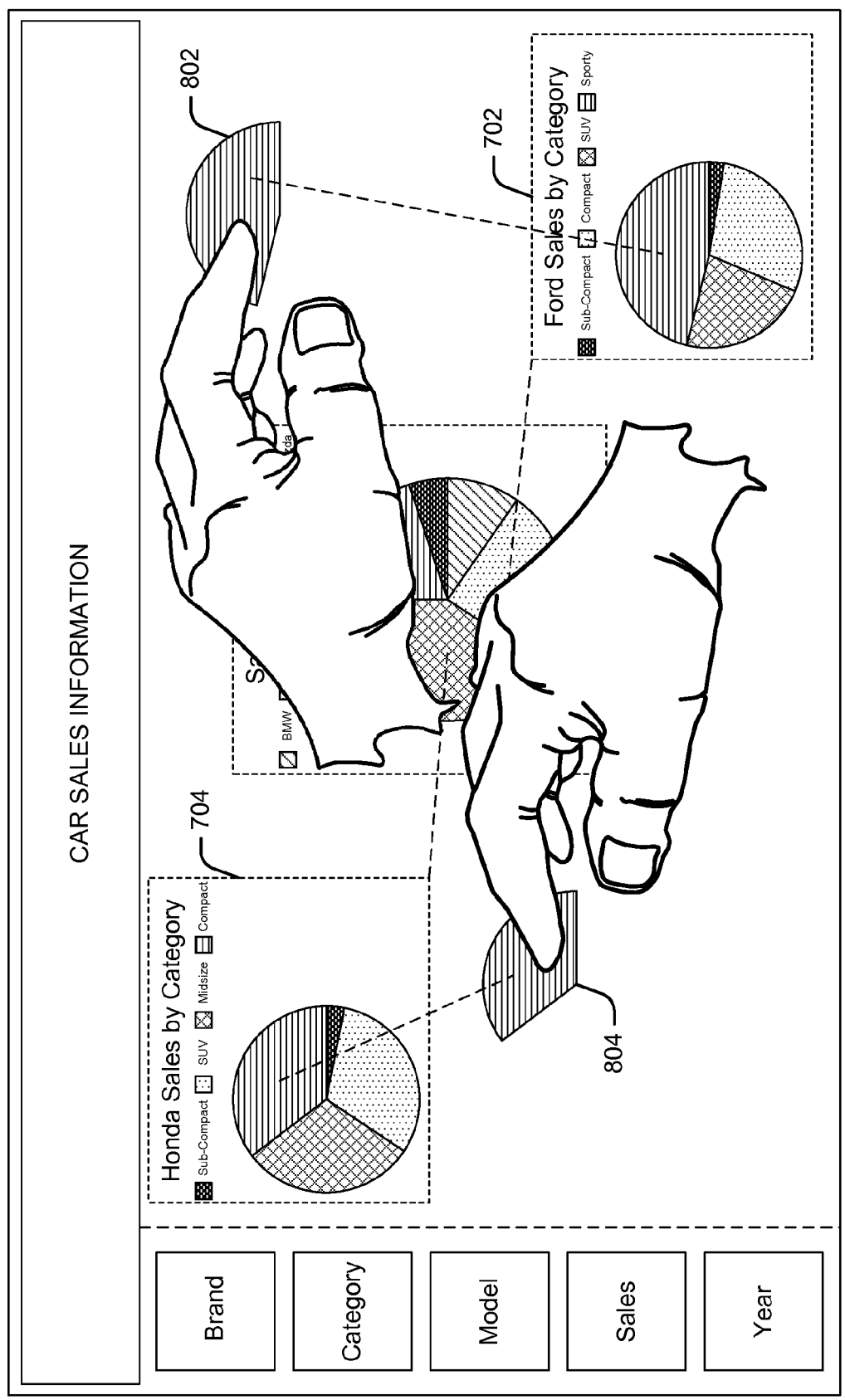
FIG. 8 is a pictorial diagram illustrating data selection within a first level drill down view of a data exploration user interface.

FIG. 8 illustrates data selection within the first level drill down view 502 to generate a second level drill down view. In the illustrated example, if the user wishes to see additional details about the top selling category for each of the top two brands, the user can select and drag out the corresponding sections of the pie charts 702 and 704. For example, the user may select and drag out section 802, which represents sales of sporty Ford vehicles. Similarly, the user may select and drag out section 804, which represents sales of compact Honda vehicles.

Figure 9:
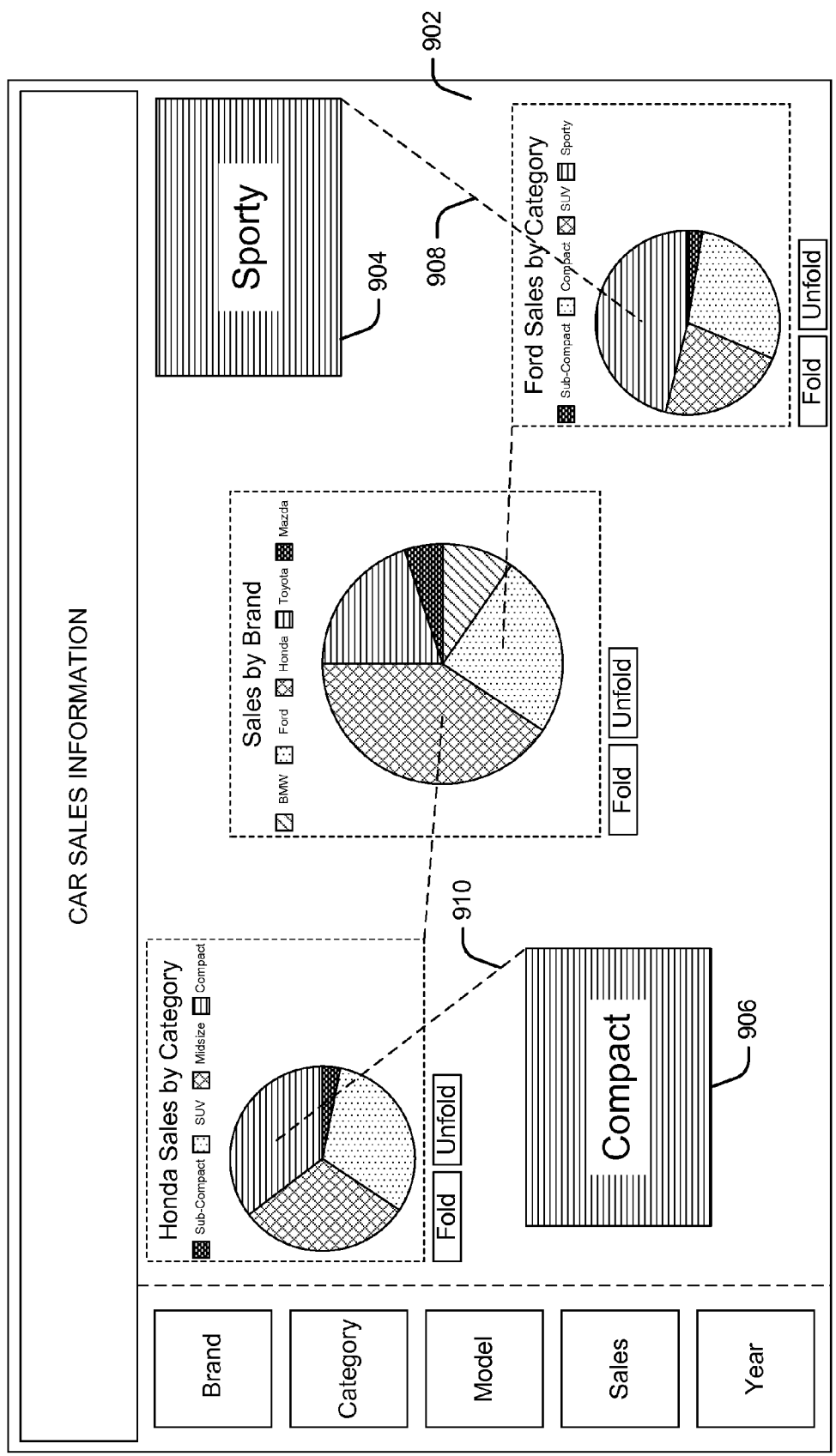
FIG. 9 is a pictorial diagram of an example screen display of a second level drill down view within a data exploration user interface.

FIG. 9 illustrates a second level drill down view 902 within data exploration user interface 112. The second level drill down view 902 includes second level blocks 904 and 906, which represent, respectively, the user-selected sections 802 and 804 from pie charts 702 and 704, as shown in FIG. 8. Furthermore, as with first level drill down view 502, second level drill down view 902 includes path indicators 908 and 910, which provide a visual indication of how blocks 904 and 906 were generated from sections 802 and 804, respectively, of pie charts 702 and 704.

Figure 10:
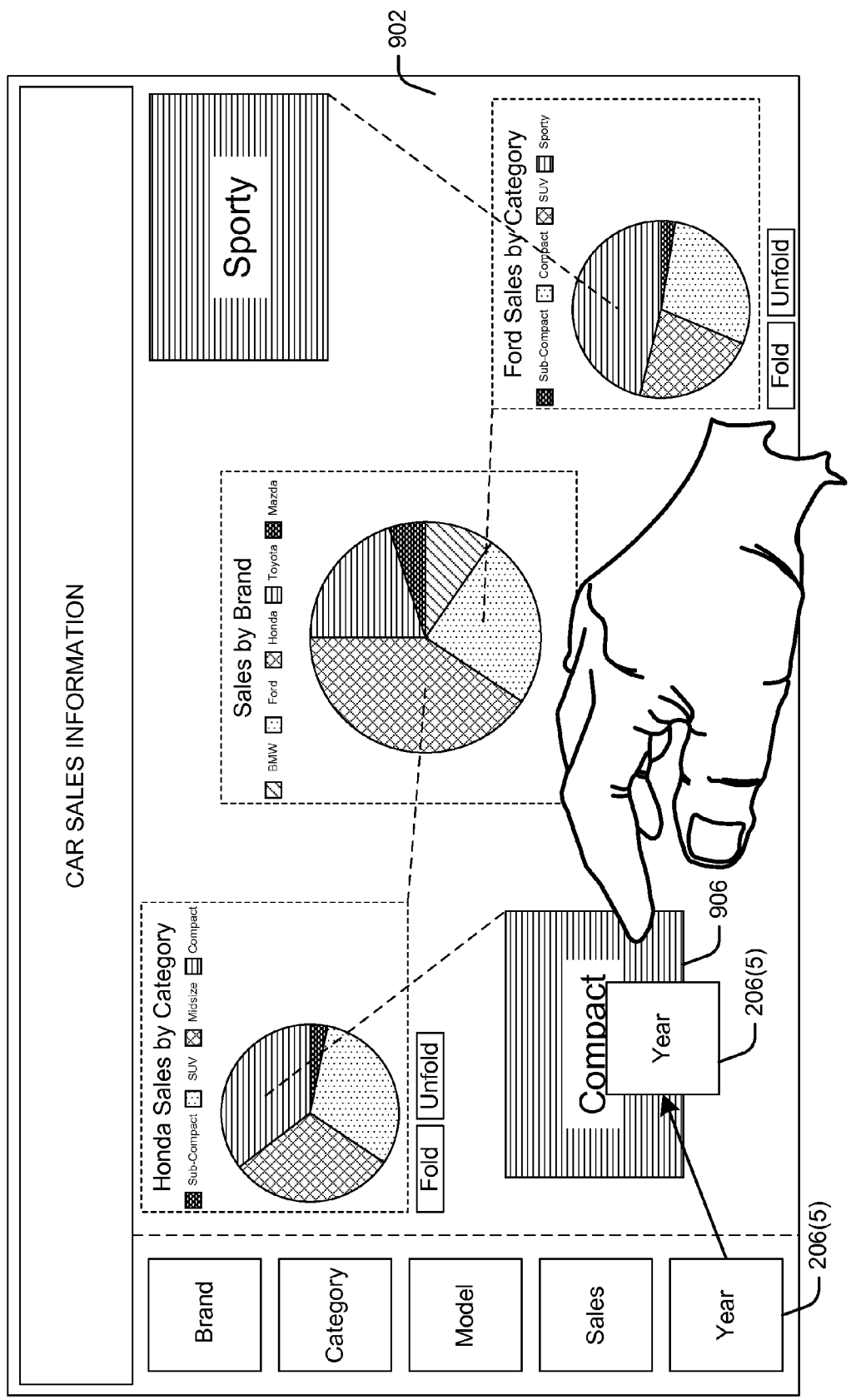
FIG. 10 is a pictorial diagram illustrating application of another data field within the second level drill down view of a data exploration user interface.

FIG. 10, similar to FIG. 6, illustrates application of another data field in the second level drill down view 902. In the illustrated example, the "Year" field is selected by the user and applied to block 906.

Figure 11:
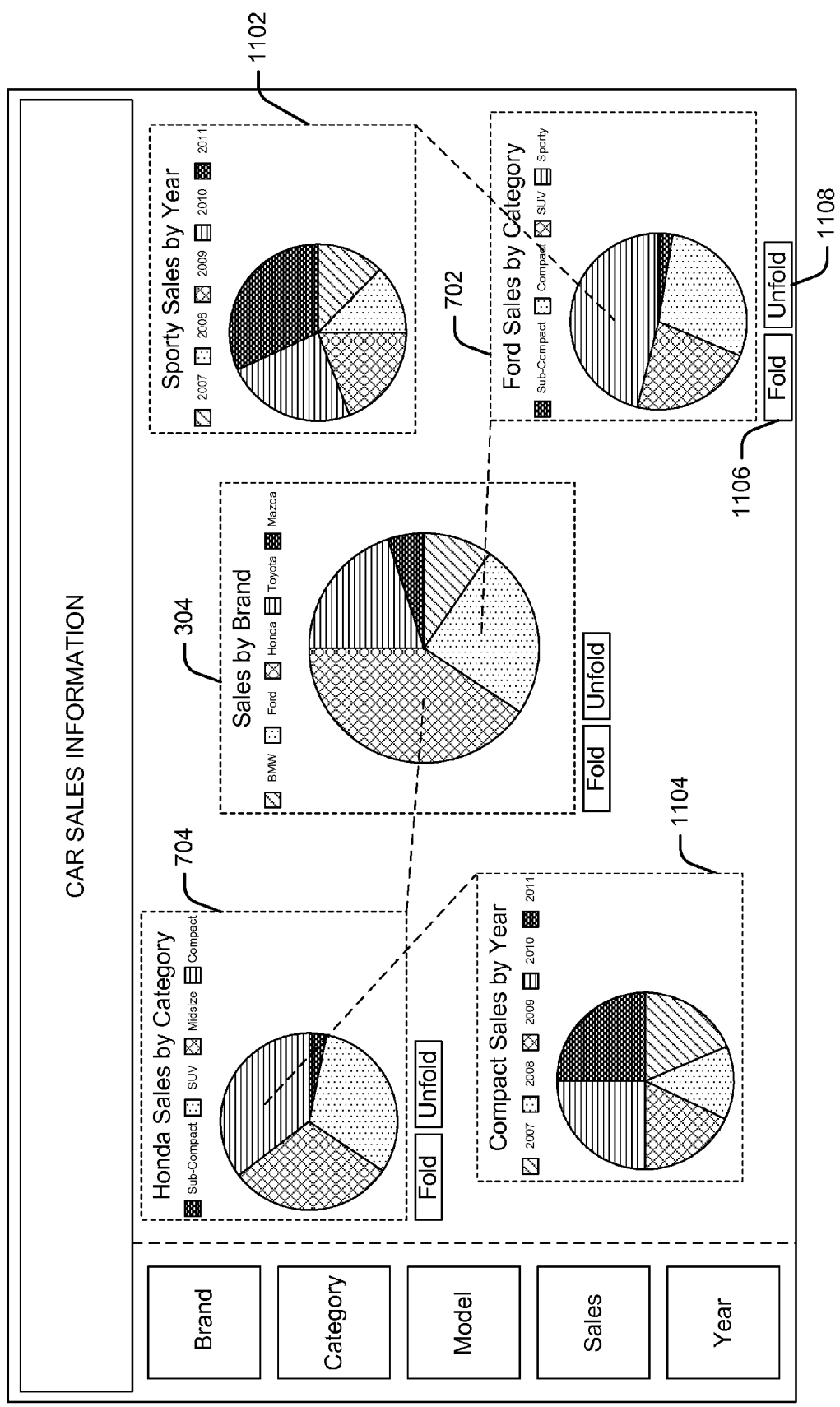
FIG. 11 is a pictorial diagram illustrating application of another data field to a previous selection within a data exploration user interface.

FIG. 11 illustrates the application of another field to a previous selection. As illustrated in FIG. 10, the user has selected the "Year" field and applied it to block 906. FIG. 11 illustrates the result of the "Year" field being applied to blocks 904 and 906. Block 904, which represented sales of sporty Ford vehicles is replaced by a pie chart 1102 that represents sales of sporty Ford vehicles by year. Similarly, block 906, which represented sales of compact Honda vehicles is replaced by a pie chart 1104 that represents sales of compact Honda vehicles by year.

As illustrated in FIGS. 5-11, each time a new drill-down level is created, "Fold" and "Unfold" buttons are added to the parent chart from which the new drill-down level is created. For example, as shown in FIG. 11, chart 304 is the parent to charts 702 and 704. Similarly, chart 702 is the parent to chart 1102, and chart 704 is the parent to chart 1104. Each parent chart has associated "Fold" and "Unfold" buttons. In an example implementation, the fold and unfold buttons may be selected to hide or show, respectively, the child charts for the parent chart. For example, if the user were to select the "Fold" button 1106, child chart 1102 would be hidden from view. Subsequently selecting the "Unfold" button 1108 would result in child chart 1102 being displayed again. This functionality enables users to effectively utilize screen real-estate to display the charts of most interest, while hiding, without deleting, those that may be of lesser interest.

Figure 12:
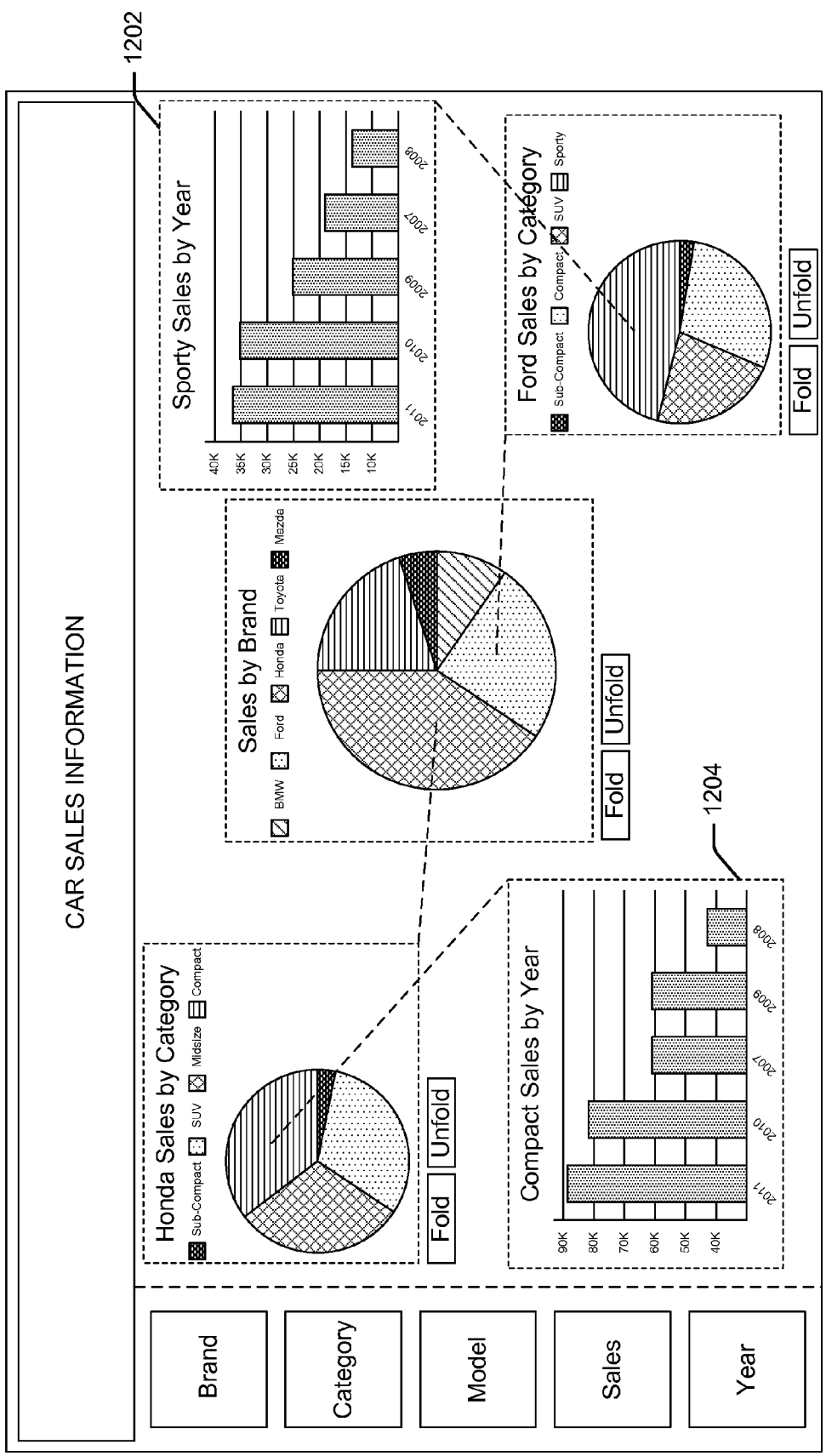
FIG. 12 is a pictorial diagram of an example data exploration user interface display that includes two bar charts.
Figure 13:
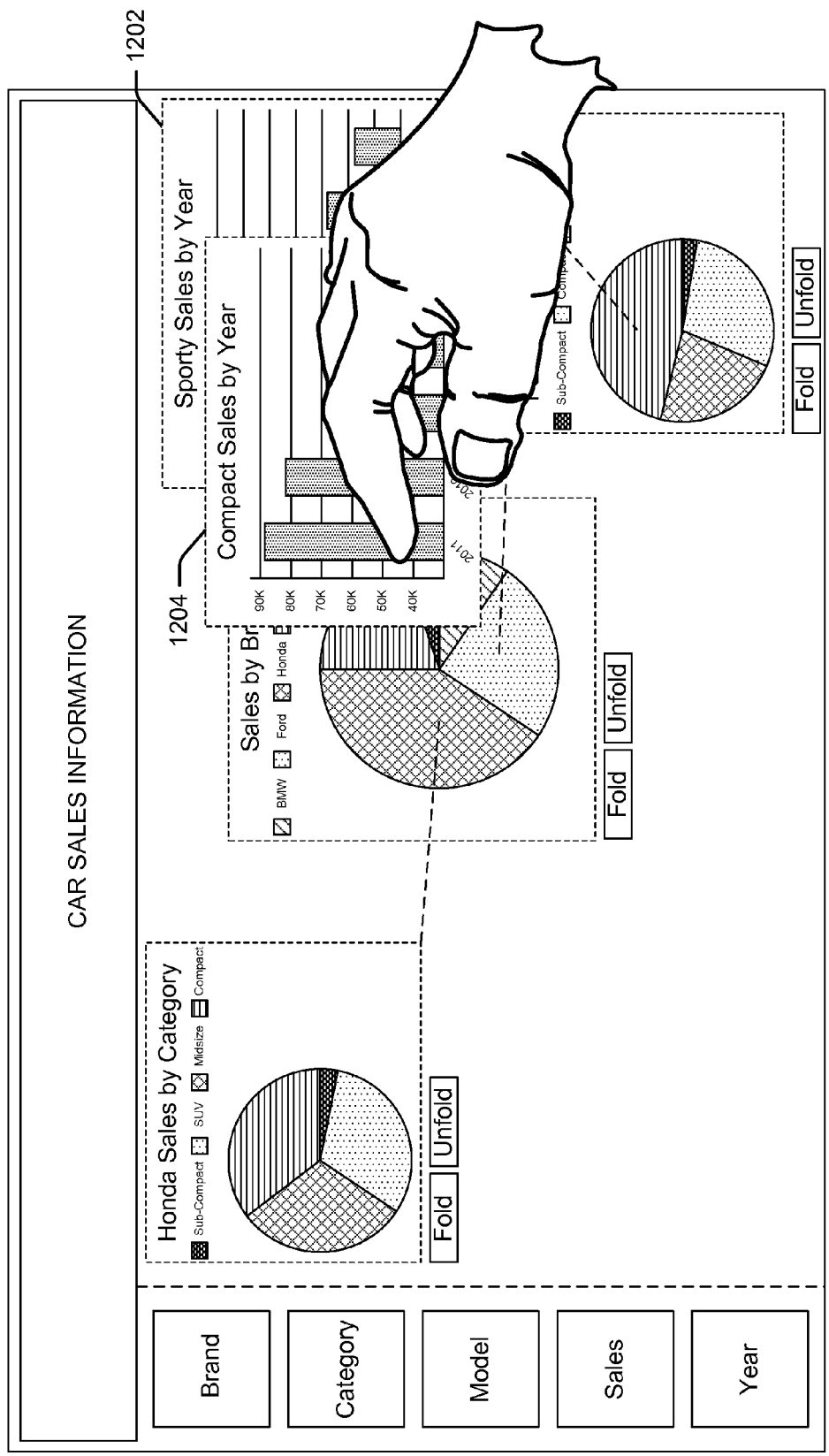
FIG. 13 is a pictorial diagram illustrating user selection of a displayed data visualization to be merged with another displayed data visualization within a data exploration user interface.
Figure 14:
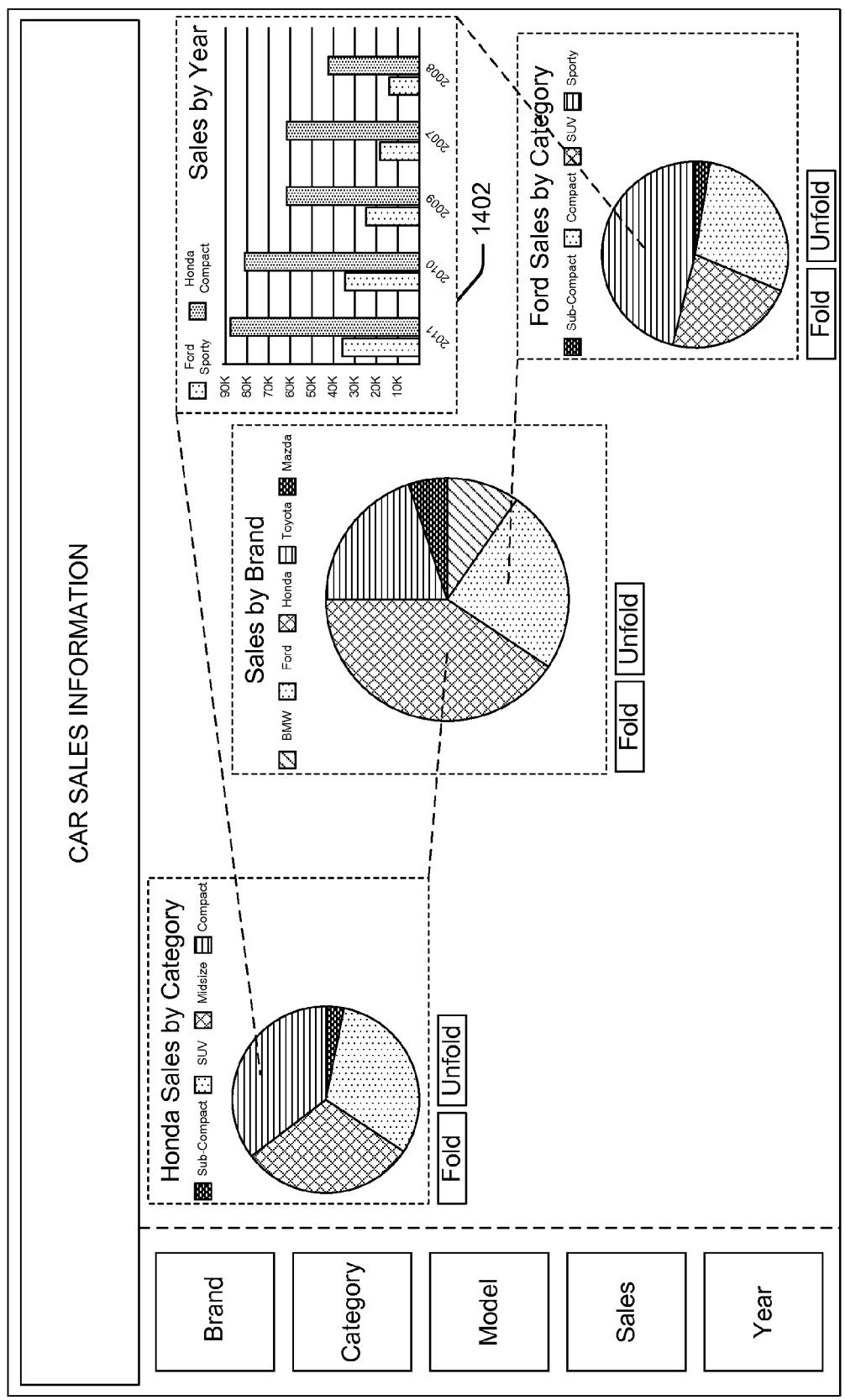
FIG. 14 is a pictorial diagram illustrating a merged data visualization resulting from two previously displayed data visualizations within a data exploration user interface.

In addition to drill-down and query-based exploration as described above, the data exploration user interface may also support merging and splitting data visualizations. FIGS. 12-14 illustrate an example in which two data visualizations are merged, and FIGS. 15 and 16 illustrate an example in which a single data visualization is split.

FIG. 12 illustrates the same data shown in FIG. 11, but with pie charts 1102 and 1104 replaced by bar charts 1202 and 1204, respectively. Techniques for converting pie charts to bar charts will be illustrated and described below with reference to FIGS. 17 and 18. Charts generated through the data exploration user interface may be combined to enable a user to easily compare data that is currently displayed in two separate charts. For example, as illustrated in FIG. 13, bar chart 1204, which represents sales of compact Honda vehicles by year, may be selected, dragged, and dropped onto bar chart 1202, which represents sales of sporty Ford vehicles by year. FIG. 14 illustrates resulting chart 1402.

Figure 15:
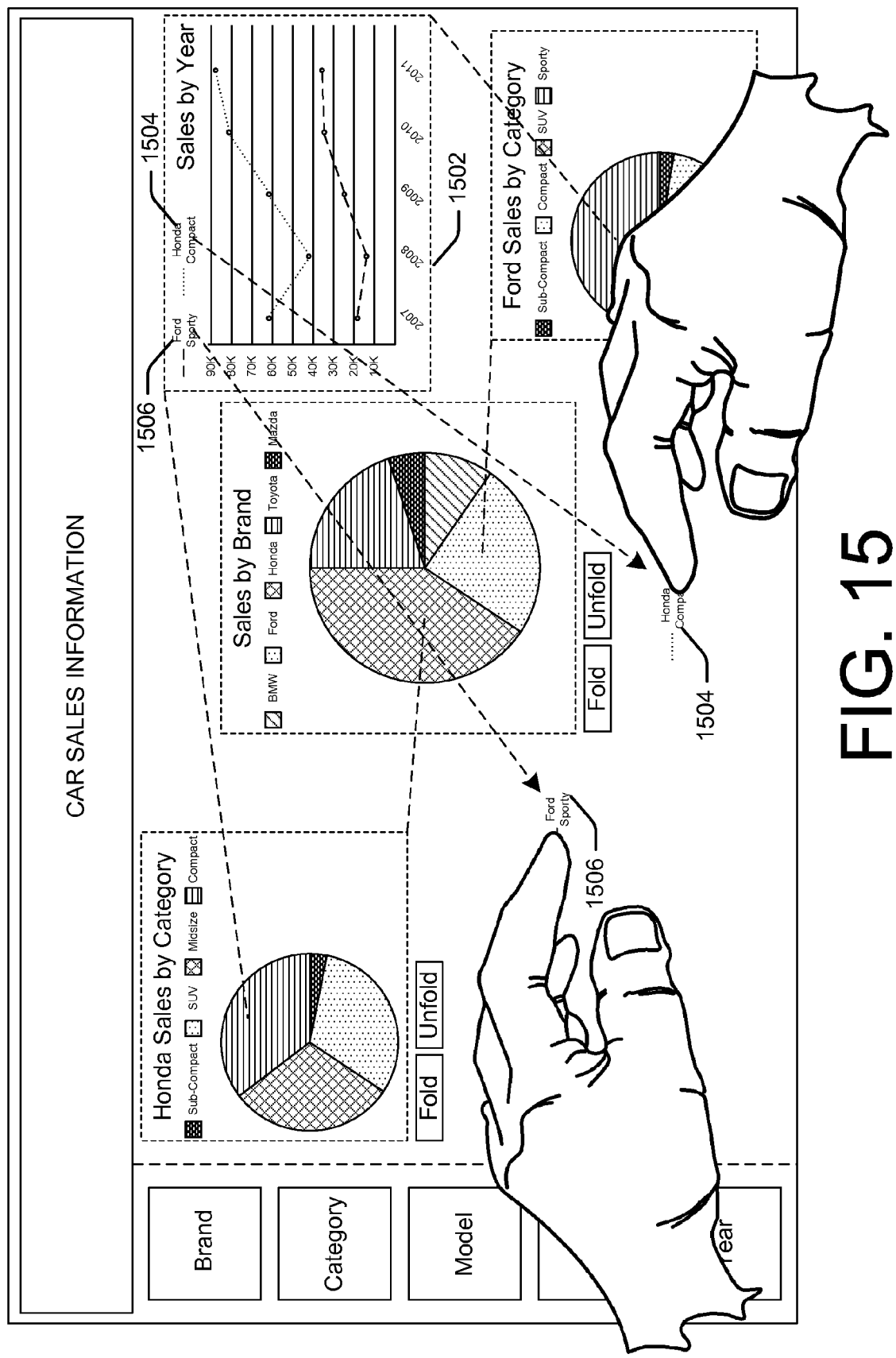
FIG. 15 is a pictorial diagram illustrating user selection of a series within a displayed data visualization to initiate a split of the data visualization.
Figure 16:
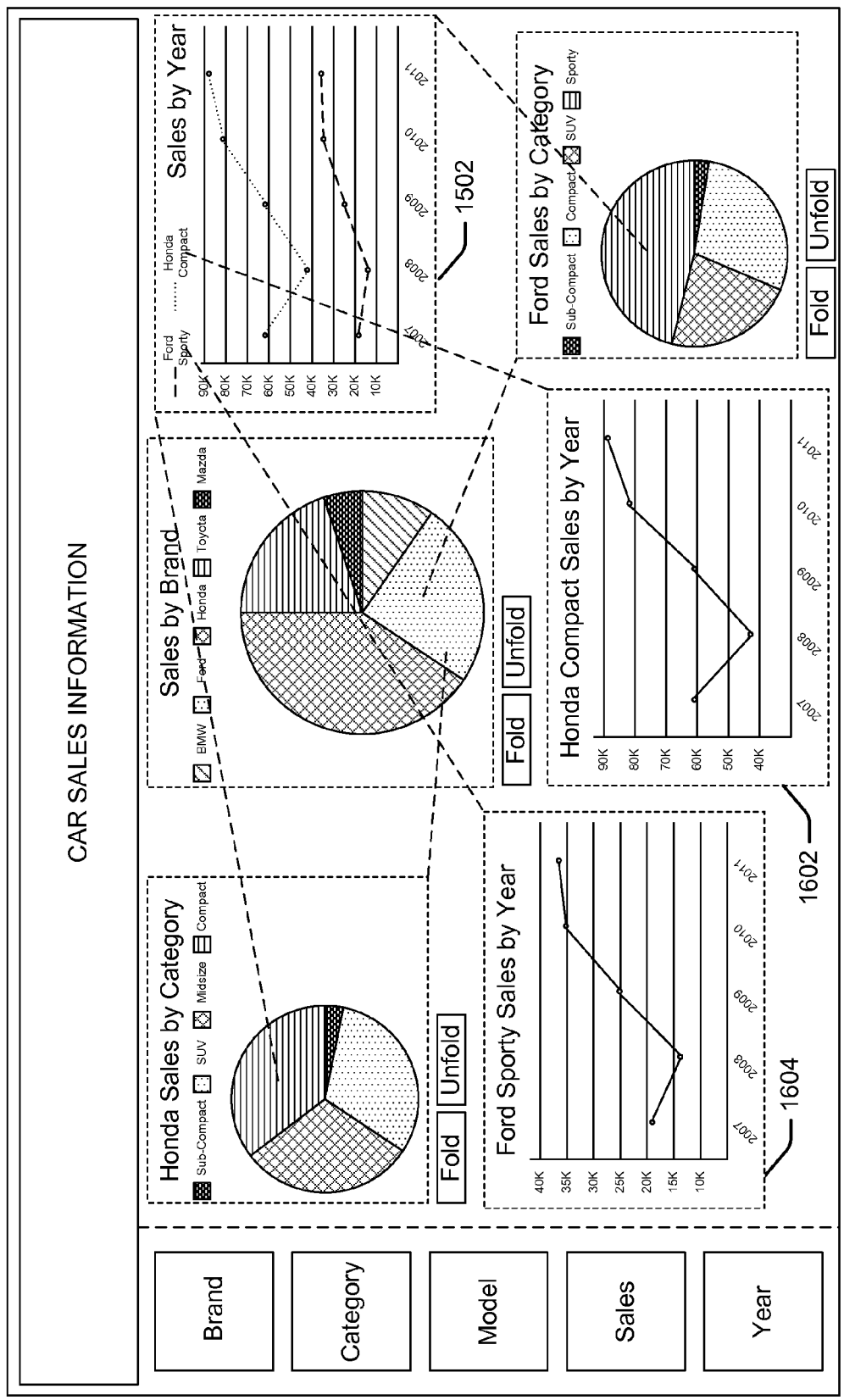
FIG. 16 is a pictorial diagram illustrating two data visualizations resulting from splitting out two series from a previously displayed data visualization within a data exploration user interface.

FIG. 15 illustrates the same data shown in FIG. 14, but with bar chart 1402 replaced by line graph 1502. Techniques for converting bar charts to line graphs will be illustrated and described below with reference to FIGS. 22 and 23. As shown in FIG. 15, a user may select one or more series from an existing data visualization to split the selected series out from the existing data visualization. For example, as shown in FIG. 15, the user has dragged out the "Honda Compact" series designator 1504 with their right hand and has dragged out the "Ford Sporty" series designator 1506 with their left hand FIG. 16 illustrates an example screen display resulting from the user dragging out the series designators as shown in FIG. 15. In the illustrated example, the existing data visualization 1502 remains on the display, and new data visualizations 1602 and 1604 are added, one for each of the selected series. In an alternate implementation, since both series represented in 1502 were dragged out, existing data visualization 1502 may be removed from the display, and instead be replaced by new data visualizations 1602 and 1604. In another alternate implementation, if a user selects a single series from a data visualization representing multiple series, a new data visualization may be generated for the selected series, and the selected series may be removed from the existing data visualization.

Example User Interface Gestures

In a touch screen environment, data exploration user interface module 110 may support gestures to enable a user to further interact with data visualizations. For example, gestures may be used to enable a user to easily and intuitively switch from one visualization format to another and to sort data within a data visualization. In a non-touch screen environment, other techniques may be employed to enable such interactions. For example, data exploration user interface module 110 may provide menu options that are accessible through the use of a keyboard or mouse, or may support voice commands. FIGS. 17-25 illustrate the use of gestures in a touch-screen environment to enable user interaction with displayed data visualizations.

Figure 17:
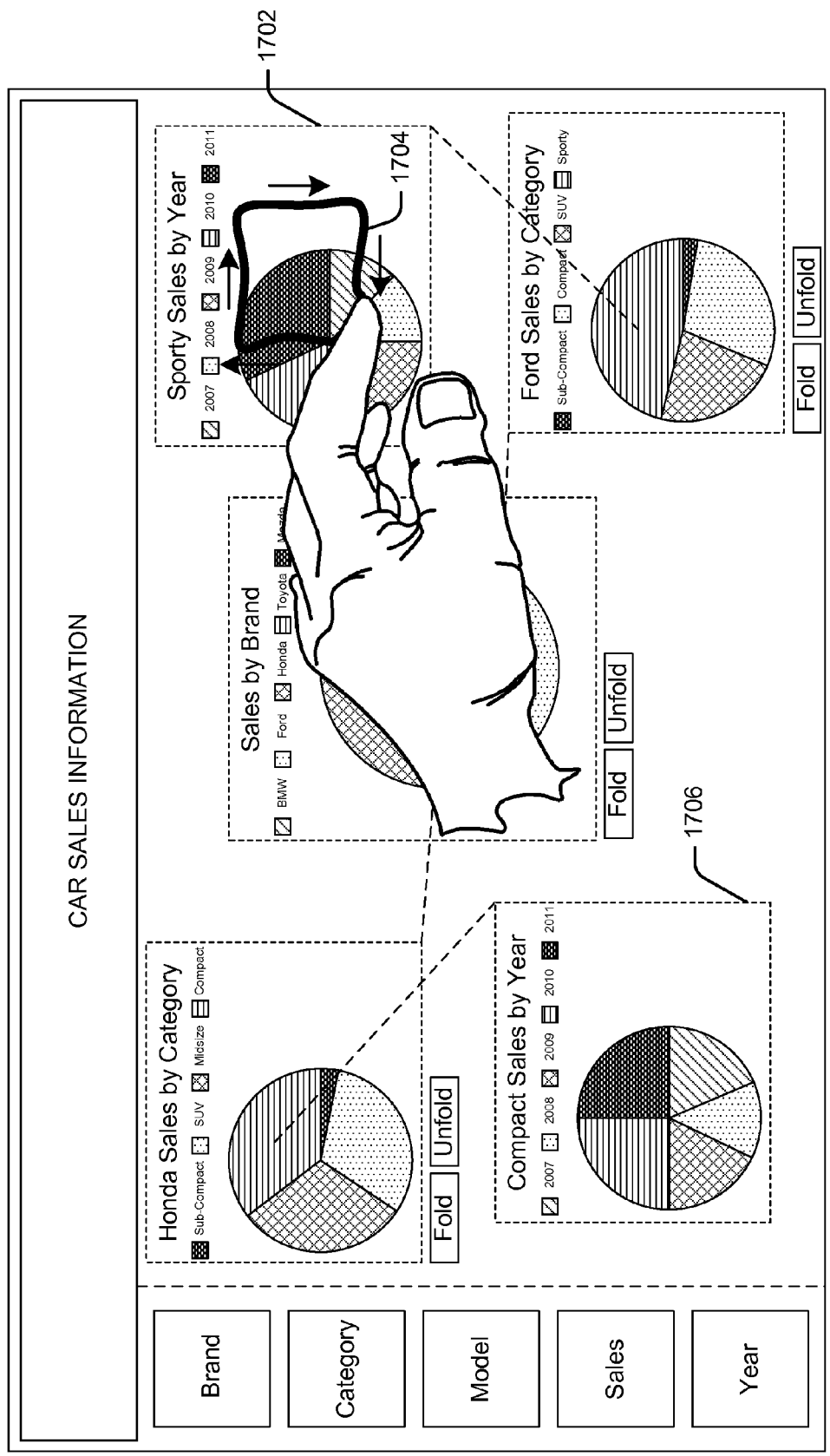
FIG. 17 is a pictorial diagram illustrating a gesture to change a data visualization to a bar chart within a data exploration user interface.
Figure 18:
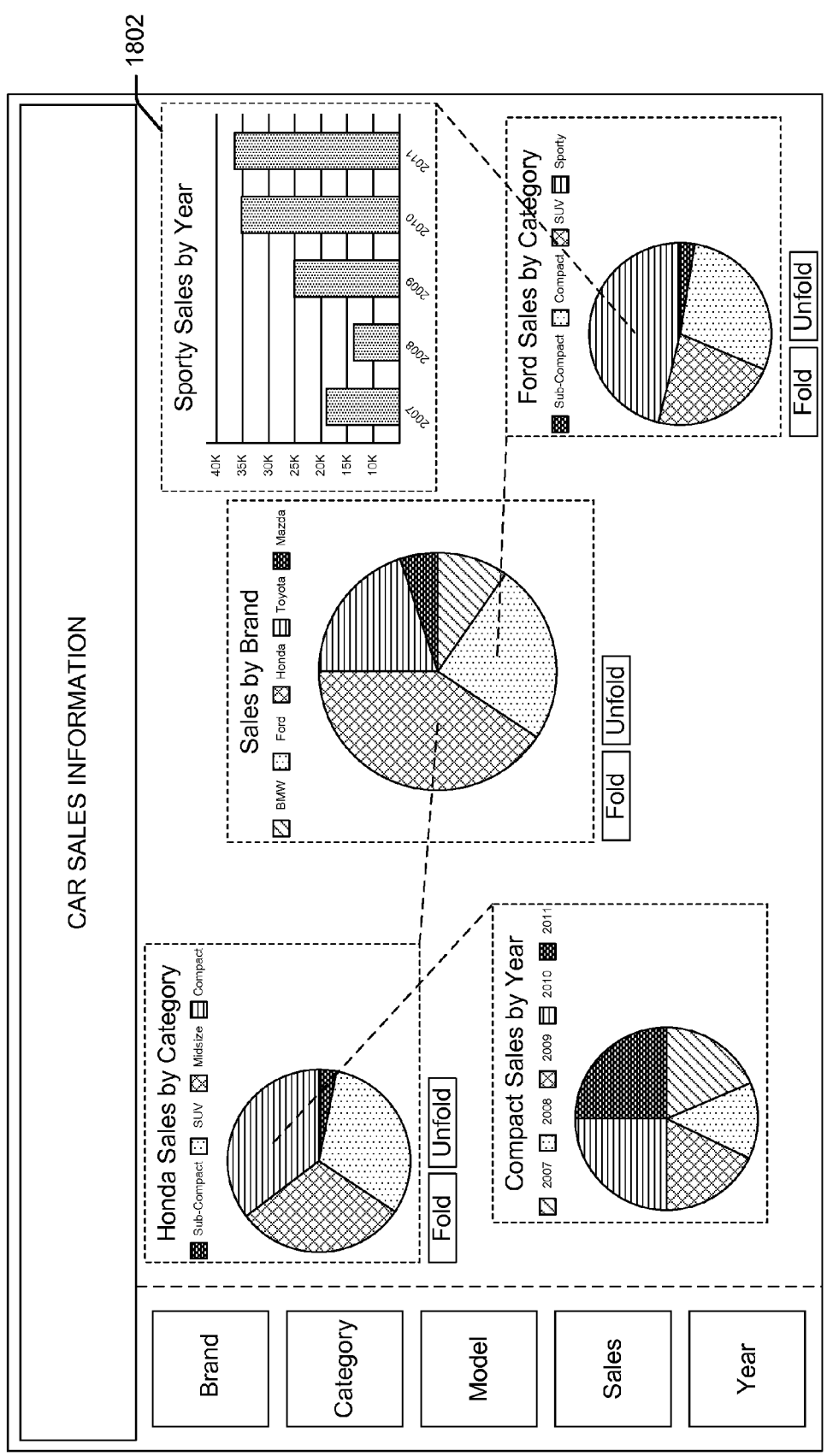
FIG. 18 is a pictorial diagram illustrating conversion of a pie chart to a bar chart within a data exploration user interface.
Figure 21:
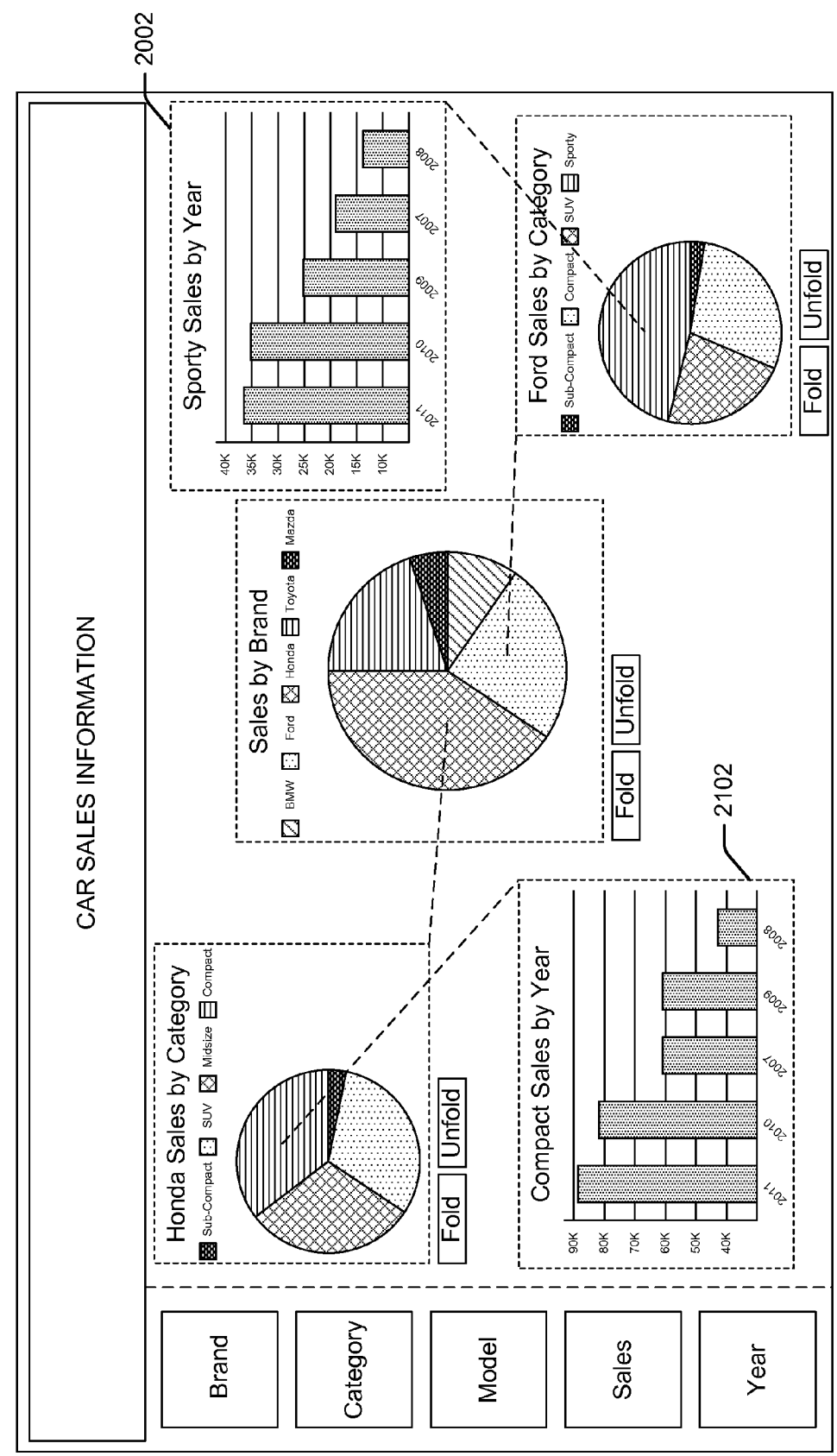
FIG. 21 is a pictorial diagram illustrating results of a user-submitted data visualization format gesture and a user-submitted sort gesture applied to a displayed data visualization within a data exploration user interface.

In the example data exploration illustrated in FIGS. 2-11, the data is visualized through pie charts. It is likely, however, that a user may wish to view at least some of the data in a different visualization format (e.g., as a bar chart as shown in FIG. 12 or as a line graph as shown in FIG. 15). To that end, data exploration user interface module 110 supports other visualization formats and enables a user to intuitively switch from one format to another. FIG. 17 illustrates a gesture to change a data visualization to a bar chart. If a user wishes to view the data expressed in pie chart 1702 as a bar chart, the user may draw a gesture 1704 on the touch screen, over the pie chart 1702. In the illustrated example, gesture 1704 is an approximately rectangular shape drawn over pie chart 1702. (FIG. 17 also includes pie chart 1706, which, as shown in FIG. 21, may also be modified using gestures.) FIG. 18 illustrates the conversion of pie chart 1702 to bar chart 1802.

Figure 19:
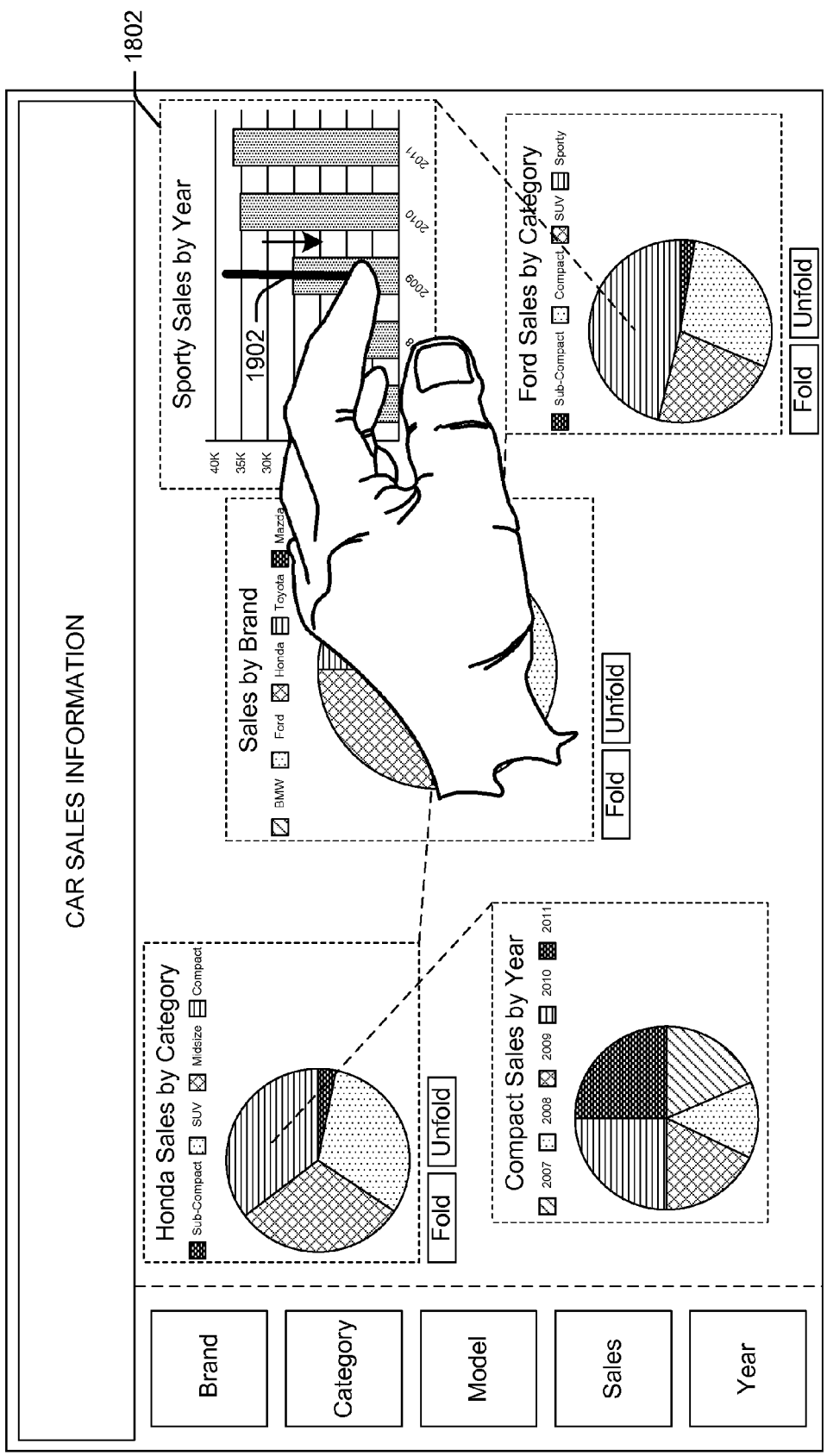
FIG. 19 is a pictorial diagram illustrating a sort gesture within a data exploration user interface.
Figure 20:
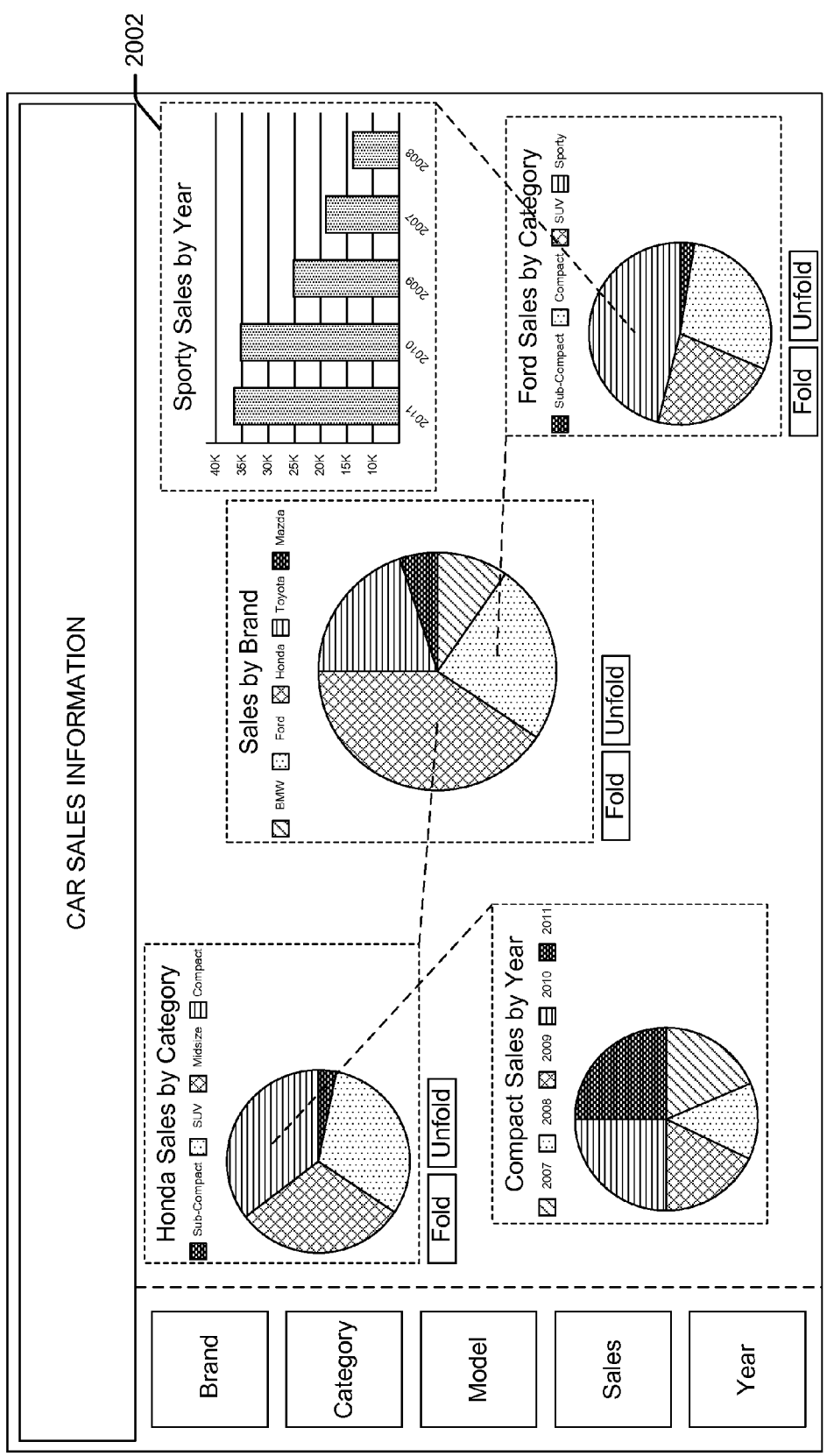
FIG. 20 is a pictorial diagram illustrating a sorted data visualization resulting from a user-submitted sort gesture within a data exploration user interface.

In an example implementation, another gesture may be used to sort data within a data visualization. For example, as illustrated in FIGS. 19 and 20, if the user gestures a line, from top to bottom, it may indicate a command to sort the underlying data from largest to smallest. (A gestured line from bottom to top may indicate a command to sort the underlying data from smallest to largest.) FIG. 19 illustrates the sort gesture 1902, while FIG. 20 illustrates the resulting display screen with chart 1802 now sorted in descending order, represented as chart 2002. FIG. 21 illustrates the results of applying gestures to pie chart 1706 to generate sorted bar chart 2102. In an example implementation, the user interface utilizes animation when sorting the data to provide a visual indication as the data is sorted.

Figure 22:
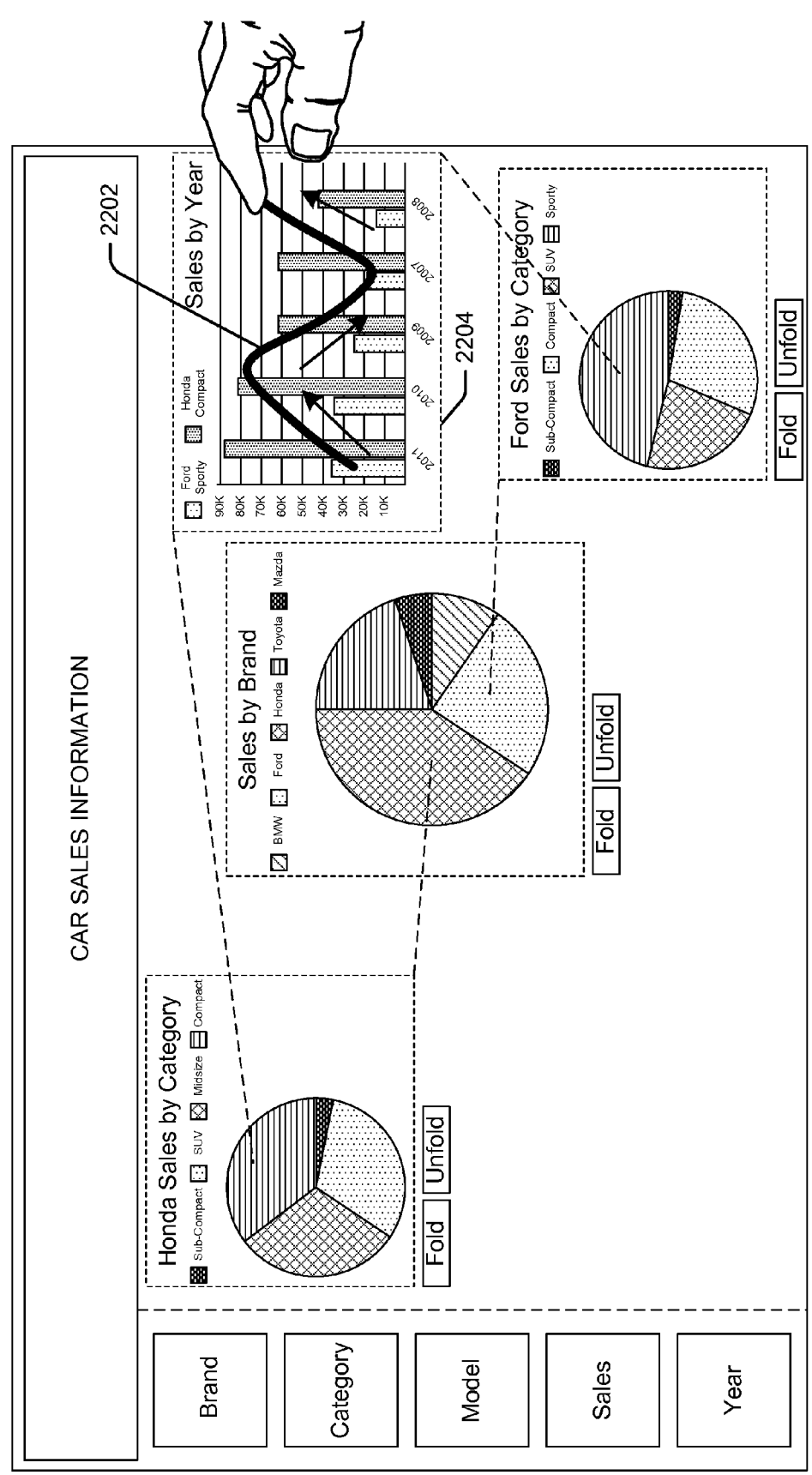
FIG. 22 is a pictorial diagram illustrating a gesture to change a data visualization to a line chart within a data exploration user interface.
Figure 23:
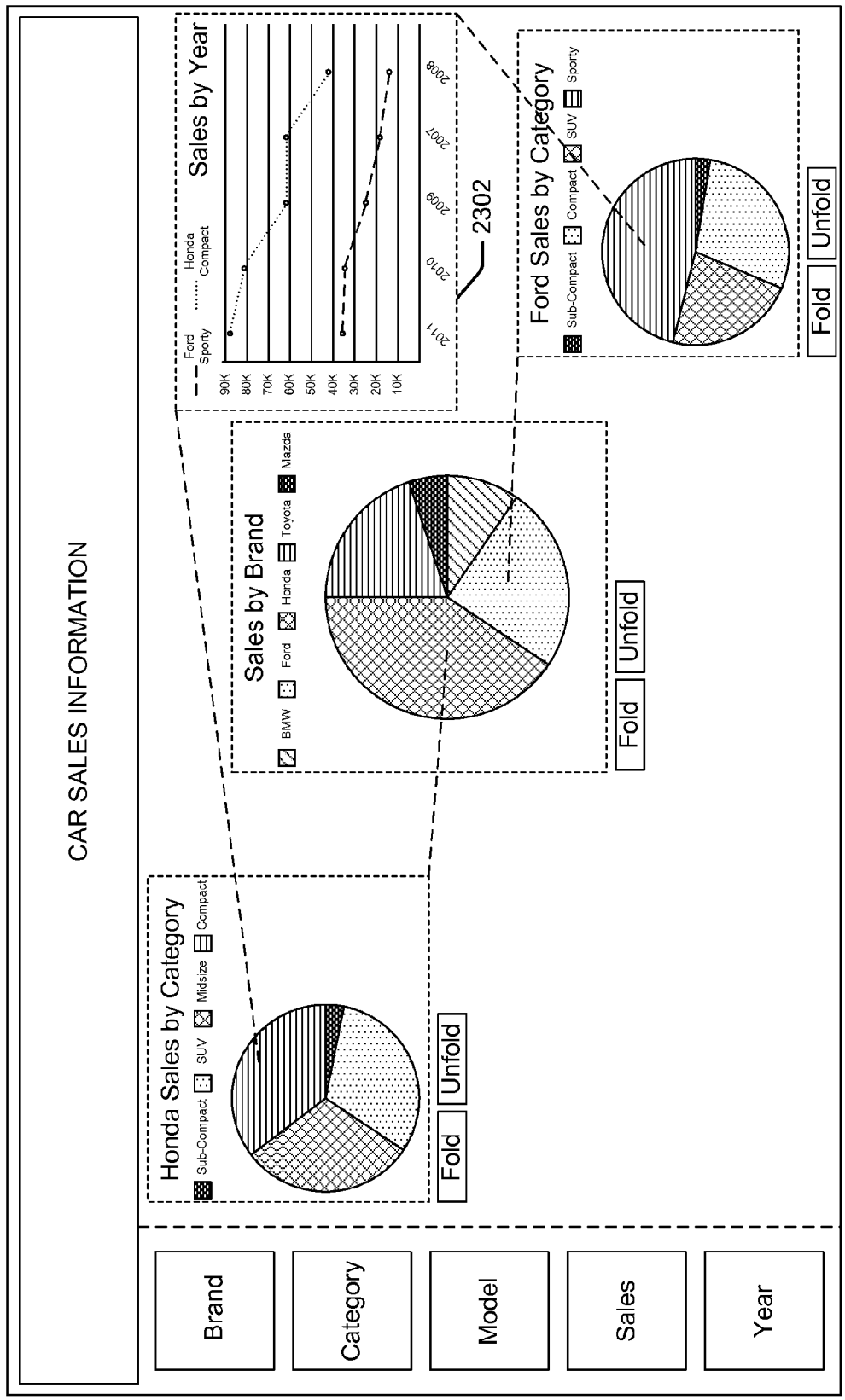
FIG. 23 is a pictorial diagram illustrating conversion of a bar chart to a line graph within a data exploration user interface.

FIGS. 22 and 23 illustrate a gesture that may be used to convert a data visualization of one format into a line chart format. FIG. 22 illustrates a line chart gesture 2202 being applied over a bar chart 2204. FIG. 23 illustrates resulting line chart 2302.

Figure 24:
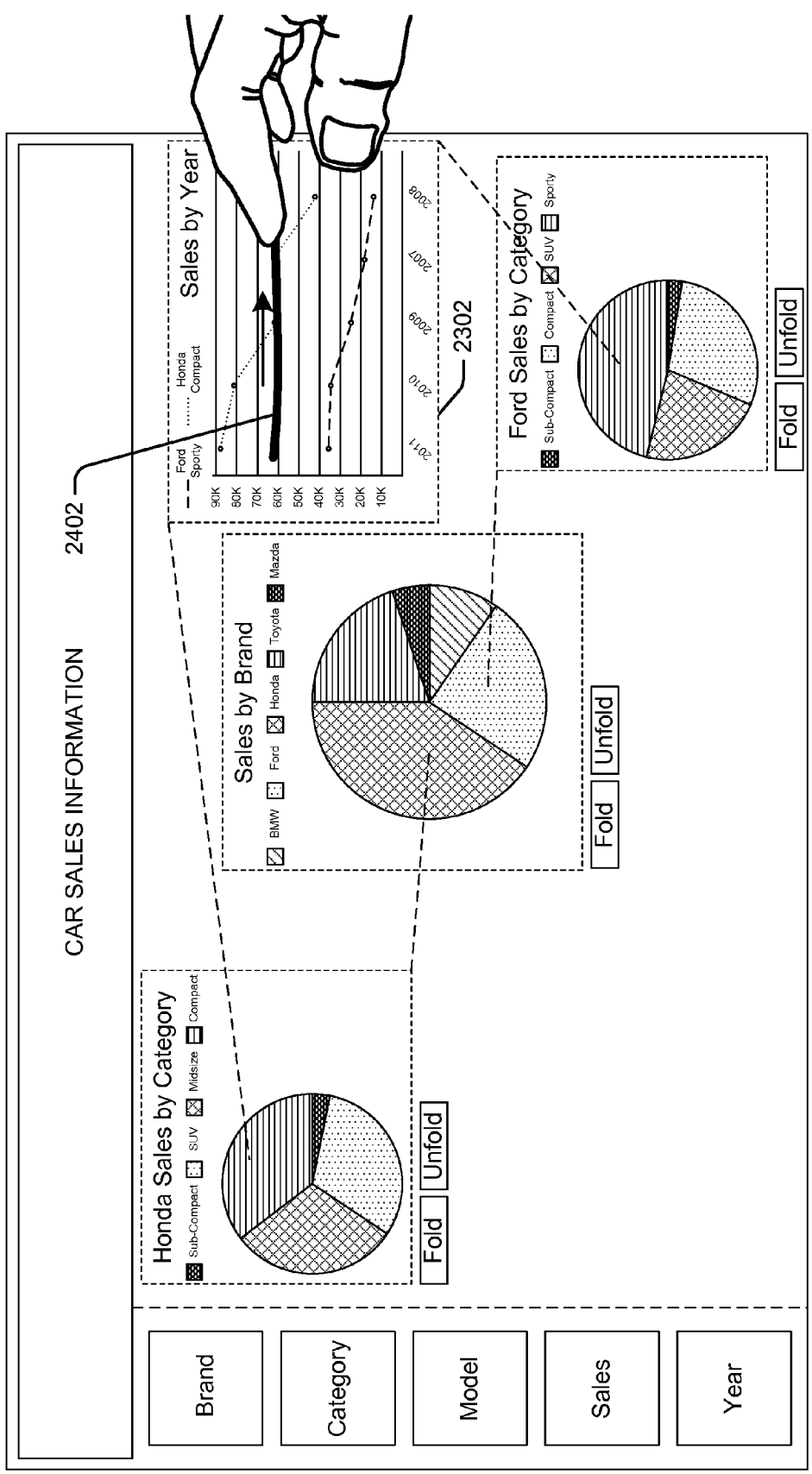
FIG. 24 is a pictorial diagram illustrating a sort gesture within a data exploration user interface.
Figure 25:
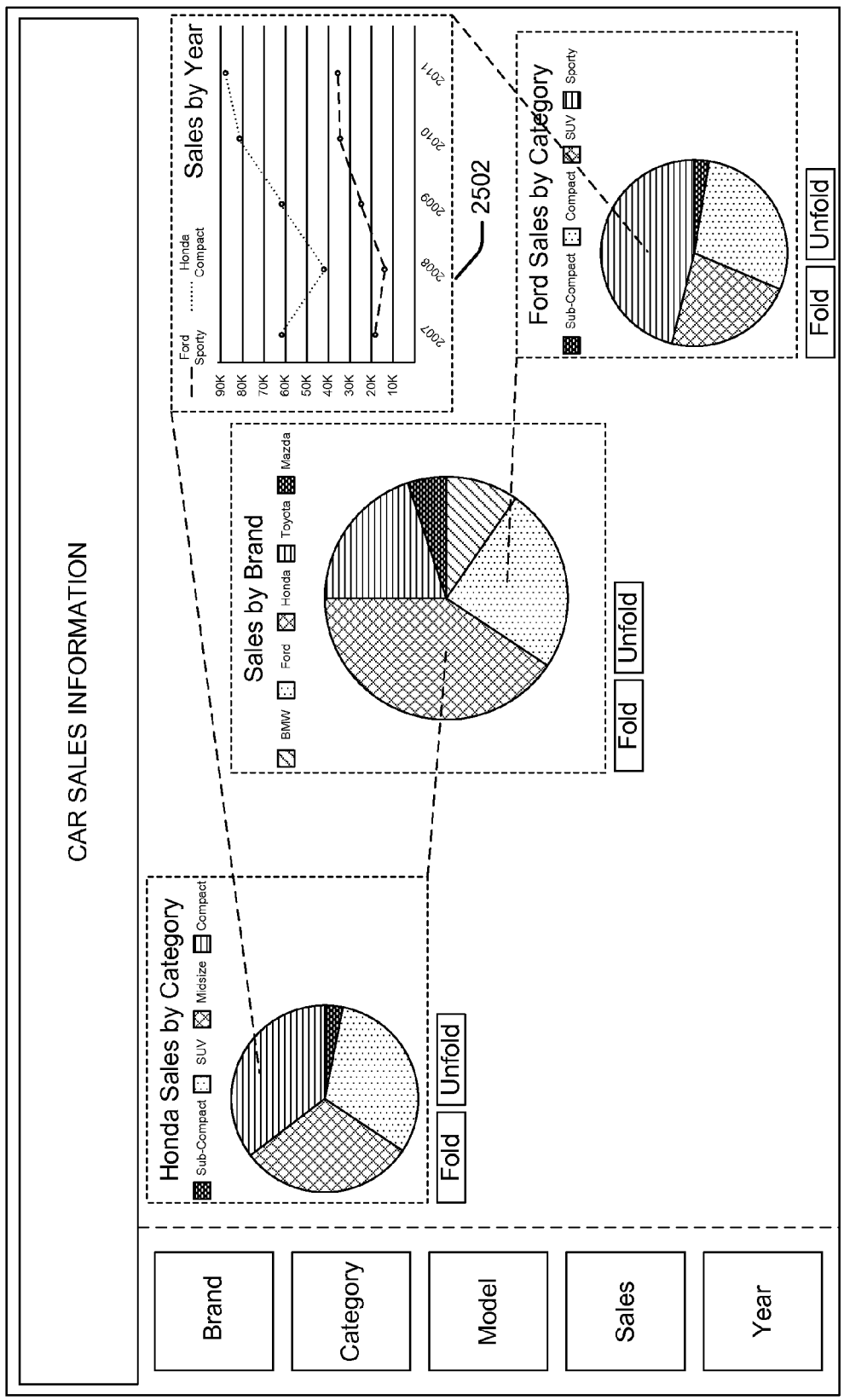
FIG. 25 is a pictorial diagram illustrating a sorted data visualization resulting from a user-submitted sort gesture within a data exploration user interface.

FIGS. 24 and 25 illustrate how another sort gesture can be applied to line chart 2302 to sort the data in ascending order by year. FIG. 24 illustrates a sort gesture 2402 that is entered over line chart 2302 to indicate a request to sort the data in ascending order by year. A similar gesture (a horizontal line) entered from right to left could be used to indicate a request to sort the data in descending order by year. FIG. 25 illustrates resulting line chart 2502, sorted in ascending order by year.

In an example implementation, the data visualization structure that has been created may be saved for future reference. Furthermore, because the data in the underlying data source may change over time, a refresh command may be used to re-execute the underlying queries for each data visualization. A refresh command may be initiated based on a menu item, a voice command, a gesture, or a device sensor activation (e.g., shaking a mobile device may be cause a refresh command to be executed).

Example Computing Device

Figure 26:
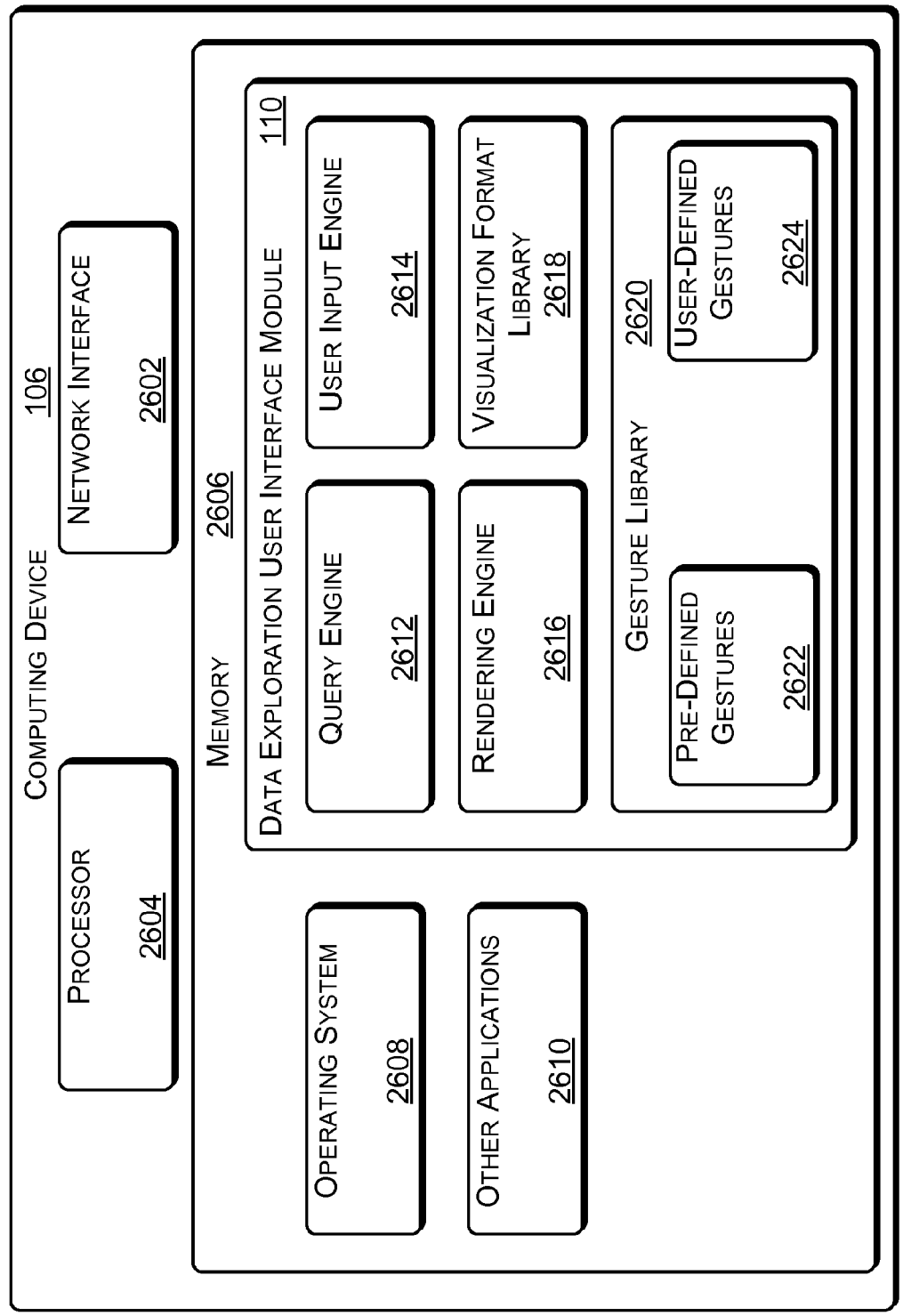
FIG. 26 is a block diagram that illustrates components of an example computing device configured to implement a data exploration user interface.

FIG. 26 illustrates components of an example computing device 106 implementing a data exploration user interface as described herein. As described above, computing device 106 represents any type of device that may implement the data exploration user interface, including, but not limited to, a table computer system, a mobile phone, or a desktop computer system. Example computing device 106 includes one or more network interfaces 2602, processor 2604, and memory 2606. Network interface 2602 enables computing device 106 to communicate over a network (e.g., network 108), for example, to access data source 102. Alternatively, although not shown in FIG. 26, data source 102 may be implemented as a local component of computing device 106.

An operating system 2608, a data exploration user interface module 110, and one or more other applications 2610 are stored in memory 2606 as computer-readable instructions, and are executed, at least in part, on processor 2604.

Data exploration user interface module includes a query engine 2612, a user input engine 2614, a rendering engine 2616, a visualization format library 2618, and a gesture library 2620. Query engine 2612 submits queries to and receives query results from data source 102. The queries submitted by query engine 2612 are formulated based on user input which is received and analyzed through user input engine 2614. For example, various types of user input may be received which may include, for example, data selection commands, data merge commands, data formatting gestures, data sorting gestures, and so on. User input engine 2614 is configured to receive the user input and to analyze the input that is received to determine an appropriate action based on the received user input.

Rendering engine 2616 is configured to render a user interface display based on user input received and analyzed through the user input engine 2614, and based on query results received through query engine 2612.

Visualization format library 2618 provides a plurality of data visualization formats in which data returned as query results through query engine 2612 may be rendered for display by rendering engine 2616. For example, visualization format library 2618 may include support for any combination of pie charts, scatter charts, bar charts, line graphs, and so on.

Gesture library 2620 provides support for any number of gestures to support user interaction with the data exploration user interface module through a touch screen interface. Gesture library 2620 may include any number of pre-defined gestures 2622 and any number of user-defined gestures 2624. Examples of gestures that may be defined in gesture library 2620 include gestures to define data visualization formats and gestures to define data sorting commands.

Although illustrated in FIG. 26 as being stored in memory 2606 of computing device 106, data exploration user interface module 110, or portions thereof, may be implemented using any form of computer-readable media that is accessible by computing device 106. Furthermore, in alternate implementations, one or more components of operating system 2608, data exploration user interface module 110, and other applications 2610 may be implemented as part of an integrated circuit that is part of, or accessible to, computing device 106.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Example Operation

FIGS. 27-31 illustrate example processes for providing a data exploration user interface as described herein. These processes are illustrated as collections of blocks in logical flow graphs, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, while this processes are described with reference to the computing device 106 described above with reference to FIGS. 1 and 26, other computer architectures may implement one or more portions of this process, in whole or in part.

Figure 27:
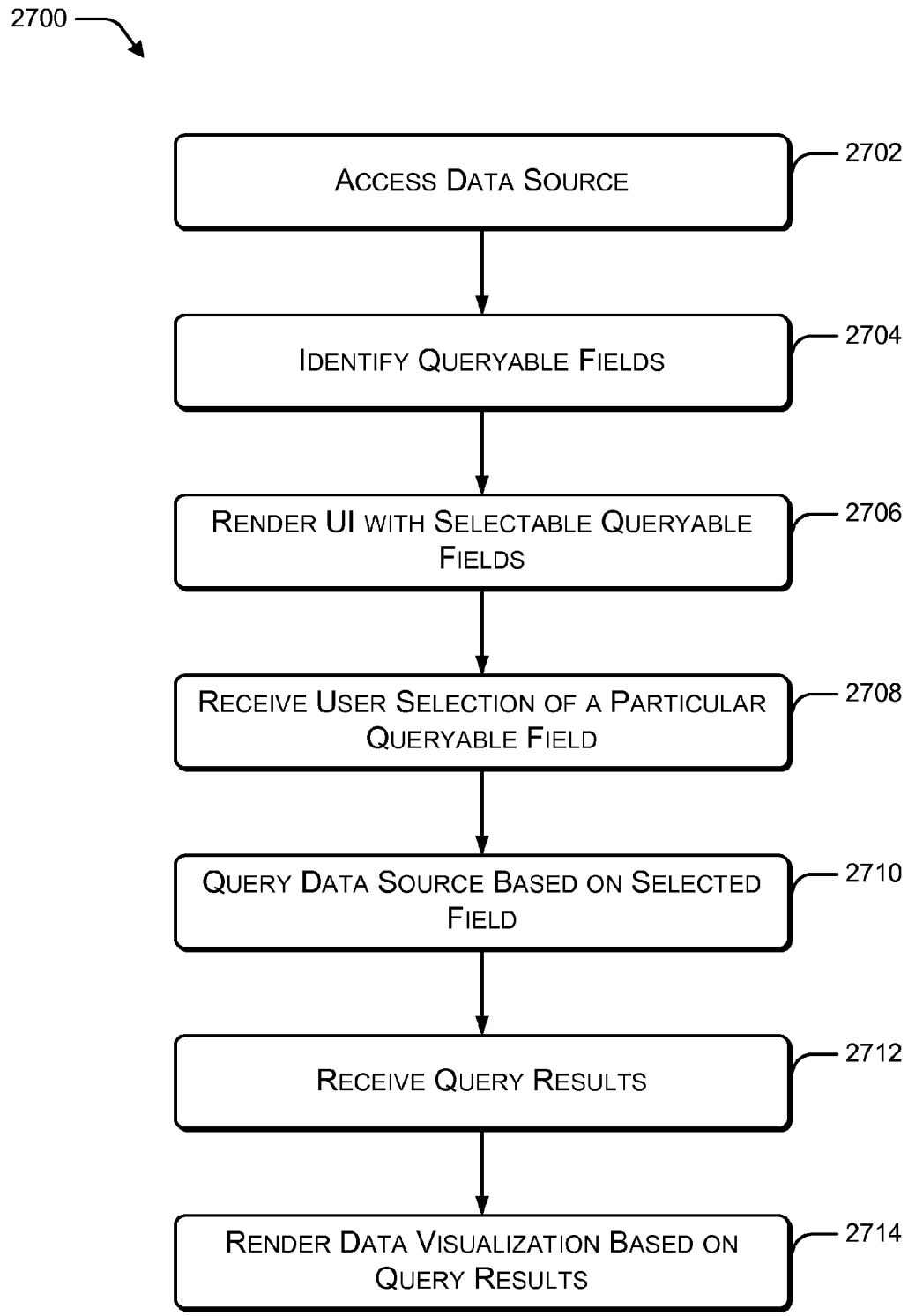
FIG. 27 is a flow diagram of an example process for first level data exploration through a data exploration user interface.

FIG. 27 illustrates an example process 2700 for first level data exploration through a data exploration user interface.

At block 2702, a data source is accessed. For example, using network interface 2602 computing device 106 accesses data source 102 through network 108. Access to the data source may be initiated in response to a specific user command or in response to launching the data exploration user interface module 110.

At block 2704, queryable fields within the data source are identified. For example, query engine 2612 determines a data structure associated with data source 102.

At block 2706, a user interface with selectable representations of the queryable fields is rendered for display. For example, rendering engine 2616 renders a user interface that includes representations of the queryable fields in a selection area of a user interface. An example of such a user interface is illustrated in FIG. 2, and described above.

At block 2708, user selection of a particular queryable field is received. Depending on the implementation environment, selection of the particular queryable field may be received via a mouse click, a menu command, a voice command, or user interaction with a touch screen. For example, as illustrated in FIG. 2, in a touch screen environment, a user may drag the representation of the particular queryable field from a selection area of the user interface display to a visualization area of the user interface display. User input engine 2614 receives the user input and determines that the user has selected the particular queryable field.

At block 2710, the data source is queried based on the selected field. For example, based on the selected queryable field as determined by user input engine 2614, query engine 2612 formulates a query and submits the query to data source 102. As one example, as shown in FIG. 2, when the user drags the "Brand" block 206(1) from the selection area of the display to the visualization area of the display, user input engine 2614 determines that the "brand" field has been selected, and query engine 2612 generates and submits a query based on "brand."

At block 2712, results of the query are received. For example, query engine 2612 receives query results from data source 102 through the network 108.

At block 2714, a data visualization is rendered based on the query results. For example, rendering engine uses a visualization format from visualization format library 2618 to generate a data visualization based on the received query results. One example is illustrated in FIG. 3 in which results of a query based on the previously selected "brand" field are displayed as a pie chart 304. In an example implementation, visualization format library 2618 includes various data visualization formats, with a particular visualization format flagged as a default. In the example illustrated in FIG. 3, for instance, the pie chart format may be indicated in the visualization format library 2618 as the default visualization format. In alternate implementations, the user may be able to select a desired visualization format, for example, prior to selecting a field on which to build a query.

Figure 28:
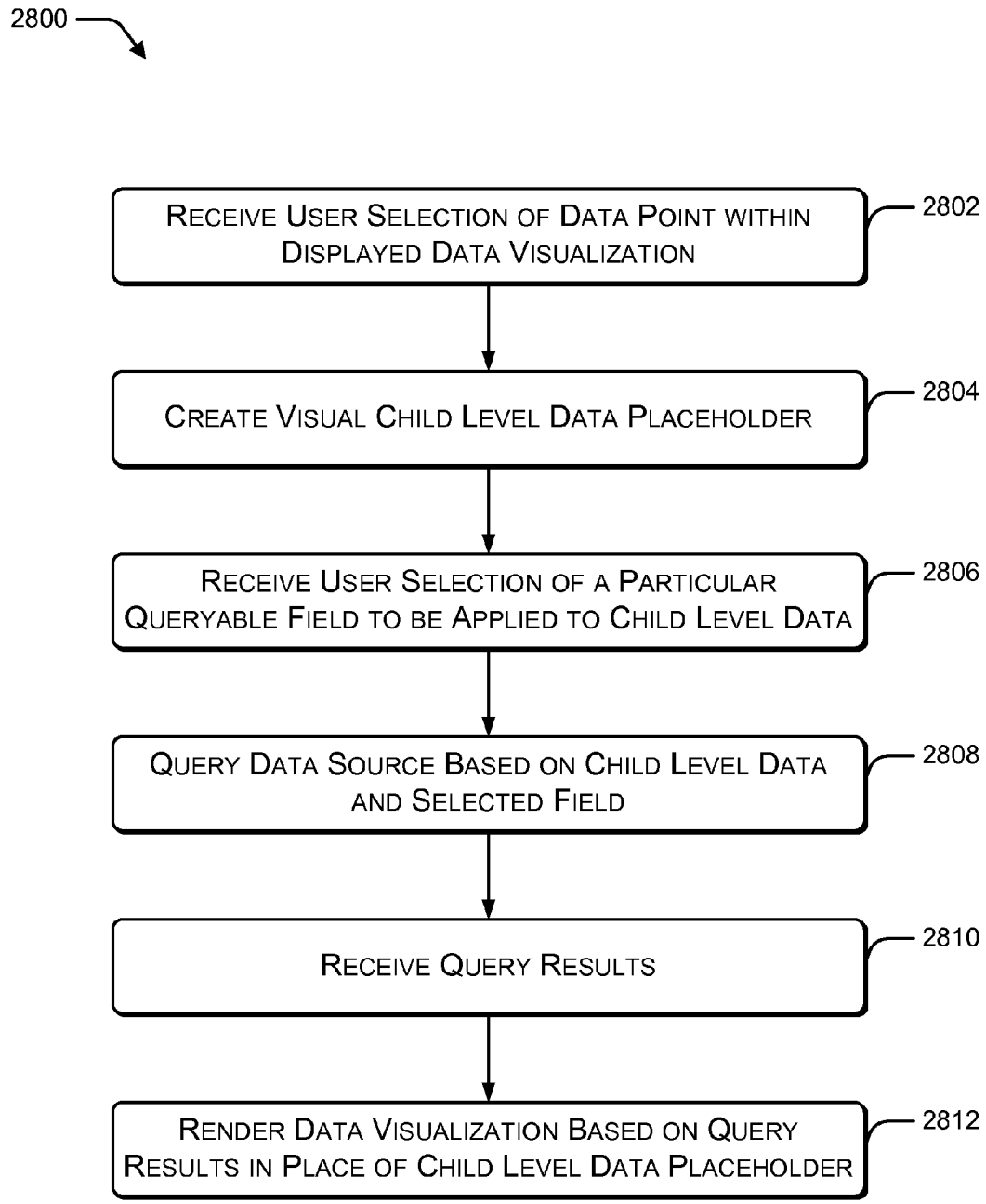
FIG. 28 is a flow diagram of an example process for exploring data through a lower level within a data exploration user interface.

FIG. 28 illustrates an example process 2800 for exploring data through a lower level within a data exploration user interface.

At block 2802, user selection of a data point within a displayed data visualization is received. For example, as illustrated and described above with reference to FIGS. 4 and 8, individual data points within a data visualization may be selected and "pulled out" to form the basis of additional data visualizations. In the illustrated examples, a particular slice from a displayed pie chart is selected and dragged out of the pie chart to another space in the visualization area of the display. When the user selects a particular data point (e.g., a slice from a pie chart, a bar in a bar chart, a data point on a line graph, etc.), user input engine 2614 detects the data point being selected.

At block 2804, a visual child level data placeholder is created. For example, as illustrated in FIGS. 5 and 9, when a particular data point is pulled out from a displayed data visualization, a placeholder is created. For example, in FIG. 5, blocks 504 and 508 are placeholders representing sales of Ford and Honda vehicles, respectively. Similarly, in FIG. 9, blocks 904 and 906 are placeholders representing sales of sporty Ford vehicles and compact Honda vehicles, respectively. After the user input engine 2614 detects the data point being selected, rendering engine 2616 renders the corresponding placeholder for display. In addition, to provide a visual history of the source of each data visualization and/or child level data placeholder, a path line is also displayed from the selected data point to the corresponding placeholder (and subsequently to any data visualization that replaces the placeholder).

At block 2806, user selection of a particular queryable field to be applied to the child level data is received. For example, as illustrated in FIG. 6, a user may drag a selectable field ("Category" 206(2)) from a selection area of the display a drop it onto a child level data placeholder (block 506). A similar scenario is also illustrated and described above with reference to FIG. 10, in which the "Year" field 206(5) is selected and dropped on the "Compact" data placeholder 906. When a user selects a field to be applied to a child level data placeholder, the user input engine 2614 detects the field that is selected and also determines the child level data represented by the placeholder onto which the selected field is dropped.

At block 2808, the data source is queried based on the child level data and the selected field. For example, the child level data represents a portion of a query result that was previously received, and the selected field may be used to pivot, filter, sort, or otherwise modify the previously received query results. The query engine 2612 submits a query based on the child level data and the selected field. For example, as illustrated in FIGS. 6 and 7, when the "category" field is selected and applied to the "Honda" placeholder, a query is submitted to obtain data representing sales of Honda vehicles, grouped by vehicle category.

At block 2810, query results are received. For example, query engine 2612 receives query results from data source 102 through the network 108.

At block 2812, a data visualization based on the received query results is rendered for display in place of the child level data placeholder. For example, when the query results are received, rendering engine 2616 creates a new data visualization based on format found in visualization format library 2618, and replaces the child level data placeholder in the display with the new data visualization. An example of this scenario is illustrated and described above with reference to FIGS. 6 and 7. As shown in FIGS. 6 and 7, when the query results are received, the child level data placeholder (506) is replaced with a new data visualization (704).

Figure 29:
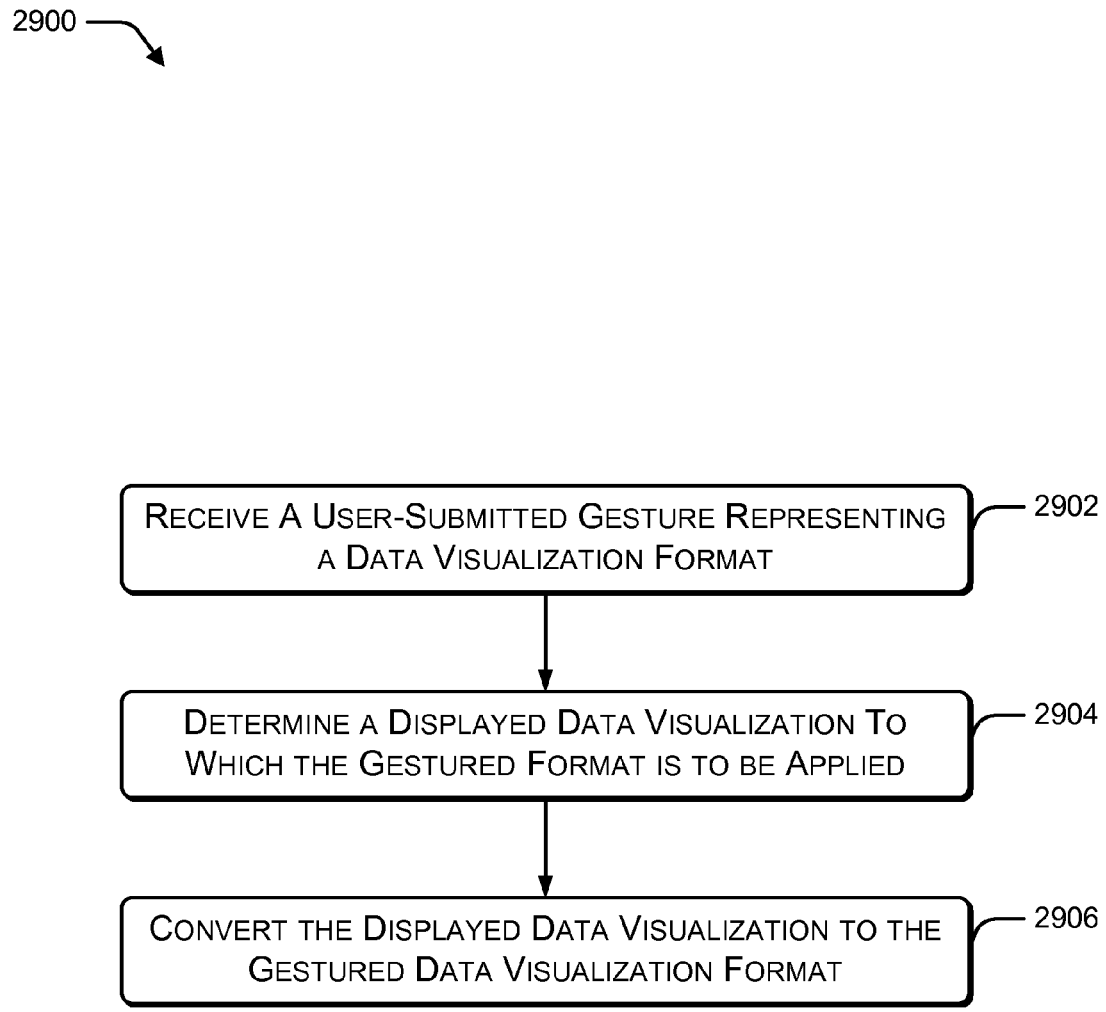
FIG. 29 is a flow diagram of an example process for modifying data visualization formats within a data exploration user interface.

FIG. 29 illustrates an example process 2900 for modifying data visualization formats within a data exploration user interface.

At block 2902, a user-submitted gesture representing a data visualization format is received. For example, as illustrated and described above with reference to FIG. 17, a gesture that is approximately rectangular in shape may be used to represent a bar graph data visualization format. Similarly, a gesture that approximates a zig-zag shape, as illustrated and described above with reference to FIG. 22 may be used to represent a line graph visualization format. Other data visualization formats may also be represented by gestures, such as a circular gesture to represent a pie chart or an upward pointing arrow-shaped gesture to represent a tree map data visualization format. In addition, in an example implementation, users may define custom gestures to represent these or other data visualization formats. User input engine 2614 detects the user-submitted gesture, and determines a corresponding data visualization format.

At block 2904, a determination is made regarding which displayed data visualization is to be modified based on the user-submitted gesture. For example, as illustrated in FIGS. 17 and 22, a gesture is typically drawn on a touch screen directly over top of a displayed data visualization, indicating that the data visualization format represented by the gesture is to be applied to the underlying displayed data visualization. As such, in addition to detecting and analyzing the user-submitted gesture, user input engine 2614 also determines the display location at which the gesture was entered, and compares that location to the display locations of any displayed data visualizations. The data visualization that is displayed at a location closest to the location of the user-submitted gesture is determined to be the data visualization to which the data visualization format is to be applied.

At block 2906 the displayed data visualization is converted to the data visualization format represented by the user-submitted gesture. For example, as illustrated in FIGS. 17 and 18, when the bar chart gesture is entered over pie chart 1702, the pie chart is converted to a bar chart 1802. Similarly, as illustrated in FIGS. 22 and 23, when the line graph gesture is entered over a bar chart 2204, the bar chart is converted to a line graph 2302. In response to receiving the user-submitted gesture, rendering engine 2616 generates a new data visualization based on the format represented by the gesture and based on the previously received query results, which are currently represented in the displayed data visualization over which the gesture was entered.

Figure 30:
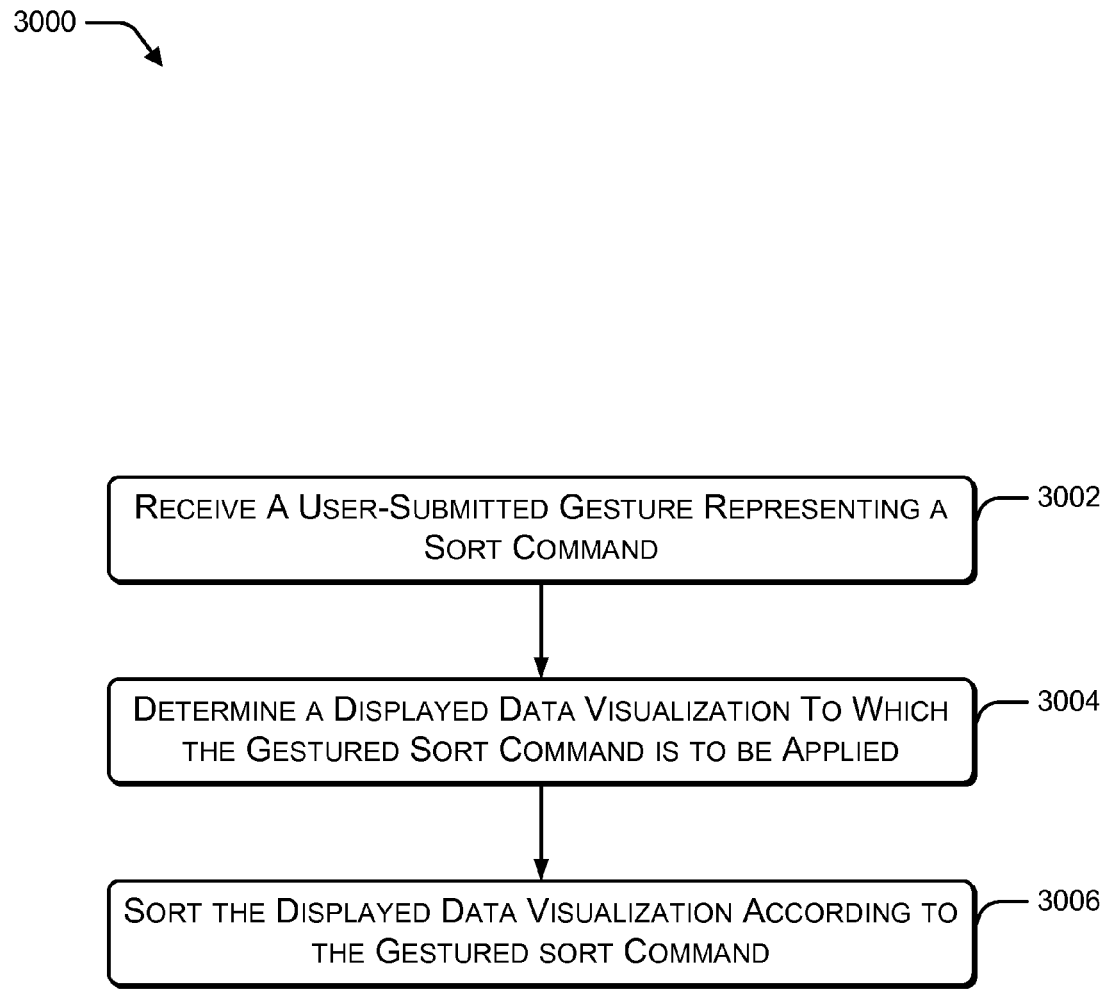
FIG. 30 is a flow diagram of an example process for sorting data within data visualizations in a data exploration user interface.

FIG. 30 illustrates an example process 3000 for sorting data within data visualizations in a data exploration user interface.

At block 3002, a user-submitted gesture representing a sort command is received. For example, as illustrated and described above with reference to FIG. 19, a user-submitted gesture in the form of a line from top to bottom may represent a command to sort in descending order based on data represented by a vertical axis (e.g., in a bar chart or line graph). Similarly, a gesture in the form of a line from bottom to top may represent a command to sort in ascending order based on data represented by a vertical axis (e.g., in a bar chart or line graph). Similarly, as illustrated and described above with reference to FIG. 24, a user-submitted gesture in the form of a line from left to right may represent a command to sort in ascending order based on data represented by a horizontal axis (e.g., in a bar chart or line graph). Similarly, a gesture in the form of a line from right to left may represent a command to sort in descending order based on data represented by a horizontal axis (e.g., in a bar chart or line graph). Other gestures representing sort commands that are applicable to other types of data visualizations may also be supported. User input engine 2614 detects the user-submitted gesture, and determines a corresponding sort command.

At block 3004, a determination is made regarding which displayed data visualization is to be sorted based on the user-submitted gesture. For example, as illustrated in FIGS. 19 and 24, a gesture is typically drawn on a touch screen directly over top of a displayed data visualization, indicating that the sort command represented by the gesture is to be applied to the underlying displayed data visualization. As such, in addition to detecting and analyzing the user-submitted gesture, user input engine 2614 also determines the display location at which the gesture was entered, and compares that location to the display locations of any displayed data visualizations. The data visualization that is displayed at a location closest to the location of the user-submitted gesture is determined to be the data visualization to which the sort command is to be applied.

At block 3006 the displayed data visualization is modified according to the sort command represented by the user-submitted gesture. For example, as illustrated in FIGS. 19 and 20, when the sort command gesture is entered over bar chart 1802, the data represented in the bar chart is sorted in descending order based on the vertical axis. Similarly, as illustrated in FIGS. 24 and 25, when the sort command gesture is entered over a line graph 2302, the data represented in line graph 2302 is sorted in ascending order based on the horizontal axis. In response to receiving the user-submitted sort command gesture, rendering engine 2616 re-generates the data visualization based on the previously received query results, which are currently represented in the displayed data visualization over which the gesture was entered, and the received sort command.

Figure 31:
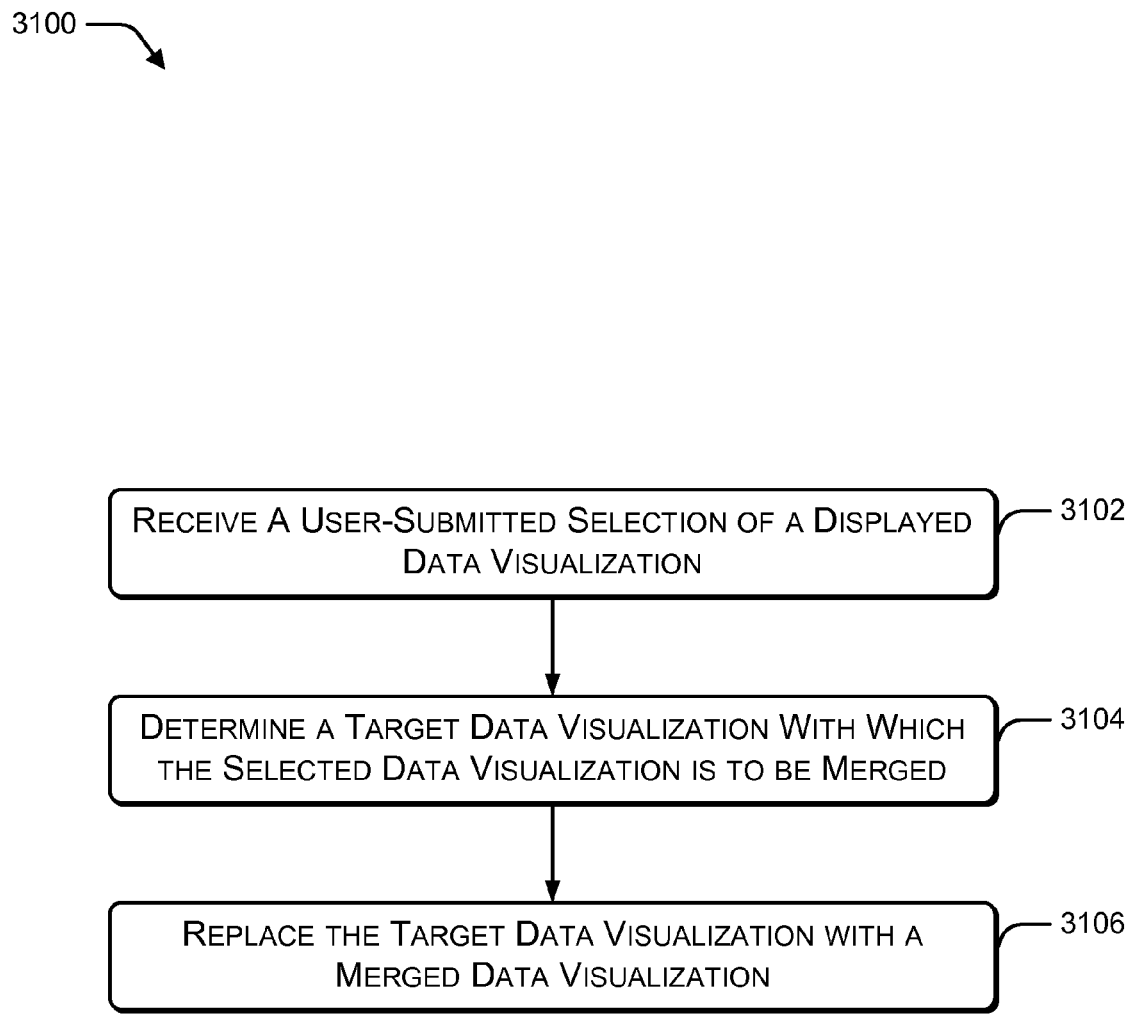
FIG. 31 is a flow diagram of an example process for merging data visualizations within a data exploration user interface.

FIG. 31 illustrates an example process 3100 for merging data visualizations within a data exploration user interface.

At block 3102, a user-submitted selection of a displayed data visualization is received. For example, as illustrated and described above with reference to FIG. 13, a user may select a displayed data visualization (1204) and drag the selected data visualization to a new location within the data exploration user interface. User input engine 2614 detects the user-submitted selection.

At block 3104, a determination is made regarding a target data visualization with which the selected data visualization is to be merged. For example, as illustrated in FIG. 13, the selected data visualization (1204) is being dropped over another displayed data visualization (1202). In other words, when a user is requesting that two data visualizations be merged, the selected data visualization is typically dragged and dropped on top of another displayed data visualization, indicating that the selected data visualization is to be merged with the underlying displayed data visualization. As such, in addition to detecting and analyzing the user selection, user input engine 2614 also determines the display location at which the selected data visualization is dropped, and compares that location to the display locations of any other displayed data visualizations. The data visualization that is displayed at a location closest to the location at which the user selected data visualization is dropped is determined to be the data visualization with which the selected data visualization is to be merged.

At block 3106 the displayed data visualization on which the selected data visualization was dropped is replaced with a merged data visualization. For example, as illustrated in FIGS. 13 and 14, when chart 1204 representing sales of Honda compact vehicles by year is dropped onto chart 1202 representing sales of sporty Ford vehicles by year, the result is a new chart 1402 that represents sales of both compact Honda vehicles and sporty Ford vehicles by year. The new data visualization is generated based on a combination of query results associated with the selected data visualization and query results associated with the target data visualization. In an example implementation, when the merged data visualization is rendered, it is displayed in place of the target data visualization, and the selected data visualization is removed from the display.

CONCLUSION

Although the subject matter has been described in language specific to structural features and/or methodological operations, it is to be understood that the subject matter defined in the appended claims is not necessarily limited to the specific features or operations described. Rather, the specific features and acts are disclosed as example forms of implementing the claims.

What is claimed is:

1. A device comprising:
   a processor; and
   memory storing instructions that, when executed by the processor, cause a graphical user interface to be displayed, the graphical user interface comprising:
   a selection area that includes representations of queryable fields within a data source; and
   a visualization area for displaying data visualizations based on queries against the data source, wherein the visualization area includes:
   a root level data visualization representing results of a query against the data source based on a particular user-selected one of the queryable fields, the results identified from the data source based on the user-selected one of the queryable fields; and
   a child-level data visualization that represents a merger of query results associated with:
   a combination of a particular data point within a displayed data visualization and a first user-selected one of the queryable fields; and
   a combination of another particular data point within a displayed data visualization and a second user-selected one of the queryable fields.

2. A device as recited in claim 1, wherein the root level data visualization comprises one of:
   a pie chart;
   a bar chart;
   a tree map;
   a bubble chart;
   a geographic map; or
   a line graph.

3. A device as recited in claim 1, wherein the visualization area further includes:
   a child-level data placeholder that represents query results associated with a particular data point within the root level data visualization; and
   a path indicator that visually represents a connection between the particular data point within the root level data visualization and the child-level data placeholder.

4. A device as recited in claim 1, wherein the visualization area further includes a path indicator that visually represents a connection between the particular data point within the displayed data visualization and the child-level data visualization.

5. A device as recited in claim 1, wherein the particular data point within the displayed data visualization and the another particular data point within the displayed data visualization are two distinct data points within a same displayed data visualization.

6. A device as recited in claim 1, wherein the first user-selected one of the queryable fields is the same as the second user-selected one of the queryable fields.

7. A device as recited in claim 1, wherein:
   the root level data visualization has a first data visualization format; and
   the child-level data visualization has a second data visualization format different from the first data visualization format.

8. A method comprising:
   accessing a data source;
   displaying a graphical user interface that includes selectable representations of queryable fields in the data source;
   receiving a user selection of a particular queryable field from the selectable representations of the queryable fields in the data source;
   querying the data source based on the particular queryable field;
   receiving query results associated with the particular queryable field from the data source;
   displaying a data visualization as part of the graphical user interface, the data visualization representing the query results;
   receiving user-submitted input representing a selection of a first displayed data visualization to be merged with a second displayed data visualization; and
   within the graphical user interface, replacing the second displayed data visualization with a third data visualization that represents a combination of query results associated with the first displayed data visualization and query results associated with the second displayed data visualization.

9. A method as recited in claim 8, wherein receiving the user selection of the particular queryable field comprises receiving an indication that the selectable representation of the particular queryable field has been dragged from a selection area of the graphical user interface and dropped into a visualization area of the graphical user interface.

10. A method as recited in claim 8, further comprising:
    receiving a user selection of a particular data point within the data visualization; and
    in response to receiving the user selection of the particular data point, rendering a child-level data placeholder in the graphical user interface, the child-level data placeholder representing a portion of the query results that represent the particular data point.

11. A method as recited in claim 10, further comprising:
    in response to receiving the user selection of the particular data point, displaying a path indicator that represents a parent-child relationship between the data visualization and the child-level data placeholder.

12. A method as recited in claim 10, further comprising:
    receiving a user selection of another queryable field from the selectable representations of the queryable fields in the data source, the user selection of the other queryable field indicating that the other queryable field is to be applied to the child-level data placeholder;
    submitting to the data source, a query based on the portion of the query results that are represented by the child-level data placeholder and based on the other queryable field to be applied to the child-level data placeholder;
    receiving query results associated with the query from the data source; and in the graphical user interface, displaying a data visualization based on the query results in place of the child-level data placeholder.

13. A method as recited in claim 8, further comprising:
receiving at a particular display location, a user-submitted touch input that visually represents a particular data visualization format;
based at least in part on the particular display location at which the user-submitted touch input was received, determining a data visualization displayed within the graphical user interface to which the particular data visualization format is to be applied; and
replacing the displayed data visualization with a data visualization having the particular data visualization format.

14. A method as recited in claim 8, further comprising:
receiving at a particular display location, a user-submitted touch input that visually represents a sort command;
based at least in part on the particular display location at which the user-submitted touch input was received, determining a data visualization displayed within the graphical user interface to which the sort command is to be applied; and
within the graphical user interface, re-displaying the data visualization with query results associated with the data visualization sorted according to the sort command.

15. A system comprising:
a processor;
a memory, communicatively coupled to the processor; and
a data exploration user interface module at least partially maintained in the memory and at least partially executed by the processor, the data exploration user interface module including:
 a query engine to submit queries to and receive queries from a data source;
 a user input engine to receive user-submitted touch input through a user interface, wherein the user input engine is configured to identify user-submitted touch inputs comprising:
  a command to select a queryable field to be represented as a data visualization within the user interface;
  a command to perform a pivot by applying a selected queryable field to an existing data visualization within the user interface;
  a command to sort underlying data of an existing data visualization within the user interface, wherein the command to sort is identified based on a user-submitted touch input that visually represents a sort command;
  a command to re-display an existing data visualization within the user interface according to a different data visualization format, wherein the command to re-display is identified based on a user-submitted touch input that visually represents the different data visualization format;
  a command to generate a new data visualization within the user interface based on selection of a portion of data represented in an existing data visualization within the user interface;
  a command to generate a child-level data placeholder within the user interface based on selection of a particular data point in an existing data visualization within the user interface; and
  a command to merge two existing data visualizations within the user interface into a single data visualization within the user interface;
 a rendering engine to render the user interface; and
 a visualization format library to maintain a plurality of data visualization formats supported by the user interface.

16. A system as recited in claim 15, wherein the user interface further includes a gesture library to maintain definitions of gestures to be interpreted by the user input engine as user-submitted commands.

17. A system as recited in claim 16, wherein the gesture library comprises one or more pre-defined gestures and any number of user-defined gestures.

18. A system as recited in claim 16, wherein the gesture library comprises:
a gesture that visually represents a sort command; and
a gesture that visually represents a data visualization format.

* * * * *